US009258159B2

(12) United States Patent
Myung et al.

(10) Patent No.: US 9,258,159 B2
(45) Date of Patent: Feb. 9, 2016

(54) TRANSMITTER AND ZERO BITS PADDING METHOD THEREOF

(71) Applicant: SAMSUNG ELECTRONICS CO., LTD., Suwon-si (KR)

(72) Inventors: Se-ho Myung, Yongin-si (KR); Hong-sil Jeong, Suwon-si (KR); Kyung-joong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/489,781

(22) Filed: Sep. 18, 2014

(65) Prior Publication Data

US 2015/0078476 A1    Mar. 19, 2015

Related U.S. Application Data

(60) Provisional application No. 61/881,083, filed on Sep. 23, 2013, provisional application No. 61/882,748, filed on Sep. 26, 2013, provisional application No. 61/882,156, filed on Sep. 25, 2013, provisional application No. 61/879,267, filed on Sep. 18, 2013.

(30) Foreign Application Priority Data

May 16, 2014   (KR) .................. 10-2014-0058988

(51) Int. Cl.
*H04L 27/36* (2006.01)
*H04L 27/26* (2006.01)
*H04L 1/00* (2006.01)

(52) U.S. Cl.
CPC .......... *H04L 27/2605* (2013.01); *H04L 1/0057* (2013.01); *H04L 1/0065* (2013.01); *H04L 1/0072* (2013.01); *H04L 1/0071* (2013.01); *H04L 2001/0093* (2013.01)

(58) Field of Classification Search
None
See application file for complete search history.

(56) References Cited

U.S. PATENT DOCUMENTS

2009/0158129 A1   6/2009   Myung et al.
2011/0119568 A1   5/2011   Jeong et al.
(Continued)

FOREIGN PATENT DOCUMENTS

JP   2012-114527 A   6/2012
KR   10-2012-0022852 A   3/2012

OTHER PUBLICATIONS

Search Report dated Dec. 29, 2014 issued by the International Searching Authority in counterpart International Patent Application No. PCT/KR2014/008718 (PCT/ISA/210).
Written Opinion dated Dec. 29, 2014 issued by the International Searching Authority in counterpart International Patent Application No. PCT/KR2014/008718 (PCT/ISA/237).
(Continued)

*Primary Examiner* — Adolf Dsouza
(74) *Attorney, Agent, or Firm* — Sughrue Mion, PLLC

(57) ABSTRACT

Provided are a transmitter, a receiver and methods of padding and depadding zero bits to an L1-post signaling. The transmitter includes: a zero padder configured to divide an information word into a plurality of groups, pad zero bits to at least one of the plurality of groups by group unit, and pad additional zero bits to at least one of the plurality of groups remaining after the zero bits are padded, thereby constituting the information word for encoding the L1-post signaling; and an encoder configured to perform encoding on the information word for encoding the L1-post signaling. The zero padder pads the additional zero bits according to a predetermined criterion, starting from a front end or a back end of the at least one of the remaining groups.

32 Claims, 16 Drawing Sheets

(56) References Cited

U.S. PATENT DOCUMENTS

| | | |
|---|---|---|
| 2012/0051335 A1 | 3/2012 | Kimura et al. |
| 2012/0185757 A1* | 7/2012 | Jeong et al. ............ 714/801 |
| 2012/0216099 A1* | 8/2012 | Jeong et al. ............ 714/800 |
| 2012/0300690 A1 | 11/2012 | Vare et al. |
| 2013/0055051 A1 | 2/2013 | Jeong et al. |
| 2013/0232394 A1 | 9/2013 | Ko et al. |
| 2013/0246883 A1 | 9/2013 | Shinya et al. |

OTHER PUBLICATIONS

Written Opinion dated Dec. 29, 2014 issued by International Searching Authority in counterpart International Application No. PCT/KR2014/008675.

International Search Report dated Dec. 29, 2015 issued by International Searching Authority in counterpart International Application No. PCT/KR2014/008675.

* cited by examiner

TRANSMITTER AND ZERO BITS PADDING METHOD THEREOF

CROSS-REFERENCE TO RELATED APPLICATIONS

This application claims priority from Korean Patent Application No. 10-2014-0058988 filed on May 16, 2014 in the Korean Intellectual Property Office, and U.S. Provisional Application No. 61/882,156 filed on Sep. 25, 2013, U.S. Provisional Application No. 61/882,748 filed on Sep. 26, 2013, U.S. Provisional Application No. 61/879,267 filed on Sep. 18, 2013 and U.S. Provisional Application No. 61/881,083 filed on Sep. 23, 2013 in the United States Patent and Trademark Office, the disclosures of which are incorporated herein in their entirety by reference.

BACKGROUND

1. Field

Apparatuses and methods consistent with the exemplary embodiments relate to a transmitter, and a zero bit padding method thereof, more specifically, to a transmitter for processing and transmitting an L1-post signaling and a zero bit padding method thereof.

2. Description of the Related Art

In the information-oriented $21^{st}$ society, broadcasting communication services become more digitized, use more broadcast channels and a wideband, and achieve a higher quality. In particular, recently, as the supply of high definition digital televisions, personal medial players, and portable broadcasting devices has become expanded, demands for a support for various reception methods of the digital broadcasting services have increased.

In response to such demands, standardization groups have established various standards to provide various services which can satisfy user needs. Therefore, ways for providing users with better services through higher signal transmission and reception performances are sought for.

SUMMARY

Exemplary embodiments provide a transmitter, a receiver and methods of padding zero bits to an L1-post signaling by means of arithmetic operations, thereby improving performance of transmission and reception of the L1-post signaling.

According to an aspect of an exemplary embodiment, there is provided a transmitter which processes and transmits an L1-post signaling which may include: a zero padder configured to divide an information word into a plurality of groups, pad zero bits to at least one of the plurality of groups by group unit, and pad additional zero bits to at least one of the plurality of groups remaining after the zero bits are padded, thereby constituting the information word for encoding the L1-post signaling; and an encoder configured to perform encoding on the information word for encoding the L1-post signaling, wherein the zero padder pads the additional zero bits according to a predetermined criterion, starting from a front end or a back end of the at least one of the remaining groups.

The zero padder may calculate a number of the plurality of groups dividing the information word based on a number of bits constituting the information word and divides the information word into the plurality of groups based on the calculated number of groups.

The zero padder may calculate a number of groups of the padded zero bits based on the number of groups constituting the information word and a number of the padded zero bits.

In a case that a number of bits constituting the L1-post signaling is not more than a number of bits constituting one of the plurality of groups, the zero padder calculates the number of groups of the padded zero bits based on Equation 6.

Here, in a case that the number of bits constituting the L1-post signaling exceeds a number of bits constituting one of the plurality of groups, the zero padder calculates the number of groups of the padded zero bits based on Equation 7.

The zero padder may determine a position of a group in the plurality of groups of the information word where the zero bits are padded based on a predetermined shortening pattern and pad the zero bits to the determined position by group unit.

The predetermined shortening pattern may be defined as shown in Table 4. In a case that the number of groups of the padded zero bits is $N_{pad}$, the zero padder may pad the zero bits to $\pi s(0)^{th}$ group, $\pi s(1)^{th}$ group, ..., $\pi s(N_{pad}-1)^{th}$ group among the plurality of groups, by group unit.

In a case that $N_{pad}$ satisfies a predetermined first criterion, the zero padder may determine $\pi_s(N_{pad})^{th}$ group as a group where the additional zero bits are padded based on Table 4, and pads additional zero bits in sequence, starting from a back end of the $\pi_s(N_{pad})^{th}$ group.

The predetermined first criterion may be that in a case that the number of groups constituting the information word is $N_{pad}$ and $N_{group}$ is the number of groups dividing the information word, $N_{pad}=N_{group}-1$.

In a case that a number of bits constituting one of the plurality of groups of the information word is 360 and a number of bits constituting the L1-post signaling is $K_{sig}$, a number of the additional zero bits may be $360-K_{sig}$.

In a case that $N_{pad}$ satisfies a predetermined second criterion, the zero padder may determine $\pi_s(N_{pad})^{th}$ group as a group where the additional zero bits are padded based on Table 4 and pad additional zero bits in sequence, starting from the back end of the $\pi_s(N_{pad})^{th}$ group.

The predetermined second criterion may be that in a case that the number of groups dividing the information word is $N_{group}$, $\pi_s(N_{pad})$ is less than a predetermined value, and $N_{pad}<N_{group}-1$.

In a case that the number of bits constituting the information word is $K_{bch}$, a number of bits constituting the L1-post signaling is $K_{sig}$, and a number of bits included in one of the plurality of groups of the information word is 360, a number of the additional zero bits may be $K_{bch}-K_{sig}-360\times N_{pad}$.

In a case that $N_{pad}$ does not satisfy the predetermined first and second criteria, the zero padder may determine the $\pi_s(N_{pad})^{th}$ group as a group where the additional zero bits are padded based on the table and pads additional zero bits in sequence, starting from a front end of the $\pi_s(N_{pad})^{th}$ group.

In a case that a number of bits constituting the information word is $K_{bch}$, a number of bits constituting the L1-post signaling is $K_{sig}$, and a number of bits included in one of the plurality of groups is 360, a number of the additional zero bits may be $K_{bch}-K_{sig}-360\times N_{pad}$.

The zero padder may map the L1-post signaling in sequence to a position where the zero bits are not padded in the information word to constitute the information word for encoding the L1-post signaling.

According to an aspect of another exemplary embodiment, there is provided a zero bits padding method of a transmitter which processes and transmits L1-post signaling, the method may include: dividing an information word into a plurality of groups; padding zero bits to at least one of the plurality of groups by group unit; padding additional zero bits to at least one of the plurality of groups remaining after the zero bits are padded, thereby constituting the information word for encoding the L1-post signaling; and performing encoding on the information word for encoding the L1-post signaling, wherein the additional zero bits are padded according to a predetermined criterion, starting from a front end or a back end of the at least one of the remaining groups.

The method may further include calculating a number of the plurality of groups dividing the information word based on a number of bits constituting the information word and divides the information word into the plurality of groups based on the calculated number of groups.

The method may further include calculating a number of groups of the padded zero bits based on the number of groups constituting the information word and a number of the padded zero bits.

In a case that a number of bits constituting the L1-post signaling is not more than a number of bits constituting one of the plurality of groups, the number of groups of the padded zero bits is calculated based on Equation 6.

In a case that the number of bits constituting the L1-post signaling exceeds a number of bits constituting one of the plurality of groups, the number of groups of the padded zero bits is calculated based on Equation 7.

The method may further include determining a position of a group in the plurality of groups of the information word where the zero bits are padded based on a predetermined shortening pattern, wherein the zero bits are padded to the determined position by group unit.

The predetermined shortening pattern may be defined as shown in Table 4. In a case that the number of groups of the padded zero bits is $N_{pad}$, padding the zero bits to a $\pi s(0)$th group, a $\pi s(1)$th group, ..., a $\pi s(N_{pad}-1)^{th}$ group out of the plurality of groups by group unit.

The padding additional zero bits may include, in a case that $N_{pad}$ satisfies a predetermined first criterion, determining $\pi_s(N_{pad})^{th}$ group as a group where the additional zero bits are padded based on the table, and padding the additional zero bits in sequence, starting from a back end of the $\pi_s(N_{pad})^{th}$ group.

The predetermined first criterion may be that in a case that the number of groups constituting the information word is $N_{pad}$ and $N_{group}$ is the number of groups dividing the information word, $N_{pad}=N_{group}-1$.

In a case that a number of groups of the information word is 360 and a number of bits constituting the L1-post signaling is $K_{sig}$, a number of the additional zero bits is $360-K_{sig}$.

The padding additional zero bits may include, in a case that $N_{pad}$ satisfies a predetermined second criterion, determining $\pi_s(N_{pad})^{th}$ group as a group where the additional zero bits are padded based on the table, and padding the additional zero bits in sequence, starting from a back end of the $\pi_s(N_{pad})^{th}$ group.

The predetermined second criterion may be that in a case that $N_{pad}$ satisfies a predetermined second criterion, determining $\pi_s(N_{pad})^{th}$ group as a group where the additional zero bits are padded based on the table, and padding the additional zero bits in sequence, starting from a back end of the $\pi_s(N_{pad})^{th}$ group.

In a case that the number of bits constituting the information word is $K_{bch}$, a number of bits constituting the L1-post signaling is $K_{sig}$, and a number of bits included in one of the plurality of groups of the information word is 360, a number of the additional zero bits may be $K_{bch}-K_{sig}-360\times N_{pad}$.

The padding additional zero bits may include, in a case that $N_{pad}$ does not satisfy the predetermined first and second criteria, determining $\pi_s(N_{pad})^{th}$ group as a group where the additional zero bits are padded based on the table, and padding the additional zero bits in sequence, starting from a front end of the $\pi_s(N_{pad})^{th}$ group.

In a case that a number of bits constituting the information word is $K_{bch}$, a number of bits constituting the L1-post signaling is $K_{sig}$, and a number of bits included in one of the plurality of groups is 360, a number of the additional zero bits may be $K_{bch}-K_{sig}-360\times N_{pad}$.

The method may further include mapping the L1-post signaling in sequence to a position where the zero bits are not padded in the information word to constitute the information word for encoding the L1-post signaling.

According to various exemplary embodiments presented herein, additional zero bits may be padded to bits, starting from a front end or a back end of one of the plurality of groups of an information word. Therefore, the L1-post signaling bits may be located continually, ranging from a bit which belongs to a group where additional zero bits are padded but to which an additional zero bit is not padded through to the following group. Or, the L1-post signaling bits may be located continuously, ranging from a group which comes right before a group where additional zero bits are padded through to a bit which belongs to a group where additional zero bits are padded but to which an additional zero bit is not padded. Accordingly, an information word may be located to the L1-post signaling by more simplified operations.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
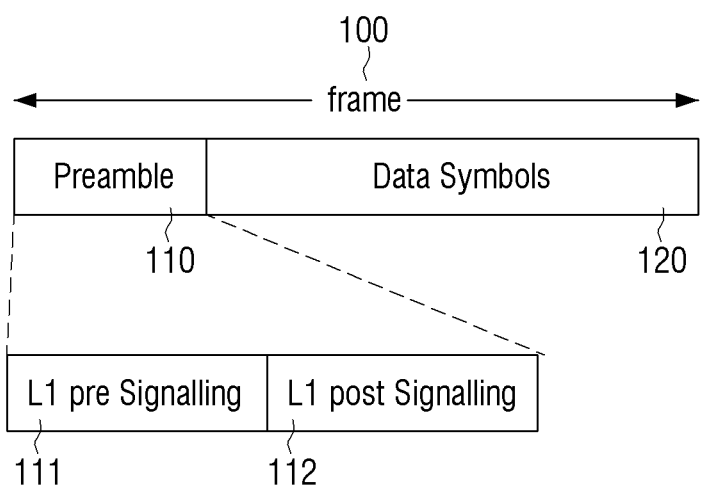
FIG. 1 is a block diagram provided to explain a structure of a frame used for a common broadcasting/communication system.

Hereinafter, exemplary embodiments will be described in detail with reference to the accompanying drawings.

In the following description, same reference numerals are used for same elements when they are depicted in different drawings. The matters defined in the description, such as detailed construction and components, are provided to assist in a comprehensive understanding of exemplary embodiments. Thus, it is apparent that other embodiments can be carried out without those specifically defined matters. Also, functions or components known in the related art are not described in detail since they would obscure the exemplary embodiments with unnecessary detail. Many of the terms used in the exemplary embodiments may be consistent with those used in the digital video broadcasting the second generation European terrestrial (DVB-T2) or the Advanced Television System Committee (ATSC) 3.0 standard.

FIG. 1 is a block diagram provided to explain a structure of a frame used for a broadcasting/communication system. Referring to FIG. 1, a frame 100 includes a preamble 110 and a data symbol 120.

The preamble 110, which is a part where an L1 signaling is transmitted, may be formed of an L1-pre signaling 111 (i.e., L1-pre signaling information) and an L1-post signaling 112 (i.e., L1-post signaling information).

Here, the L1-pre signaling 111 includes information which a transmitter (not illustrated) needs in order to access the L1-post signaling 112, and the L1-post signaling 112 includes information which a receiver (not illustrated) needs in order to access a physical layer pipe (PLP).

The data symbol 120 is a part for transmitting substantive broadcasting data and may be formed of one or more PLPs. In this case, a different signal processing operation may be performed for each PLP. For example, a different modulation method and a different code rate may be used for each PLP.

As shown above, in case of a common broadcasting/communication system, a transmitting side can transmit broadcasting data using a frame structure as shown in FIG. 1, and a receiving side obtains information on a method of transmitting data, a frame length, etc. through the L1 signaling and can receive the broadcasting data through a PLP.

Hereinafter, the exemplary embodiments of the inventive concept relate to a method of processing the L1-post signaling. Hereinafter, lengths of a codeword, an information word, parity bits, an L1 signaling, etc. refer to the number of bits which are included therein, respectively.

Figure 2:
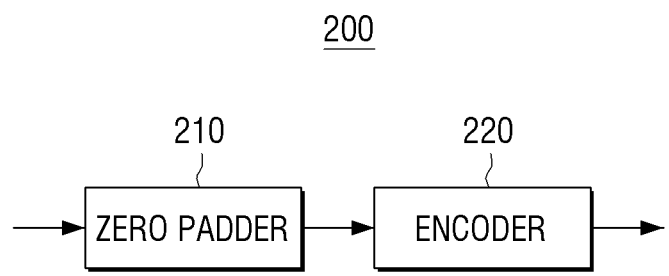
FIG. 2 is a block diagram to explain a configuration of a transmitter according to an exemplary embodiment.

FIG. 2 is a block diagram to explain a configuration of a transmitter according to an exemplary embodiment. According to FIG. 2, a transmitter 200 includes a zero padder 210 and an encoder 220.

The zero padder 210 pads zero bits or zero padding bits to an L1-post signaling and generate an information word. The zero padder 210 outputs the information word to the encoder 220.

Here, the L1-post signaling may be formed of less number of bits than an information word that can be encoded. The number of bits constituting the L1-post signaling, i.e., a length of the L1-post signaling, may vary.

The encoder 220 performs encoding in an order of Bose, Chaudhuri, Hocquenghem (BCH) coding and Low Density Parity Check (LDPC) coding, and in case of the BCH coding, an information word having a specific length is required depending on a code rate. Therefore, the zero padder 210 may pad zero bits to the L1-post signaling such that the L1-post signaling becomes long enough to satisfy a length requirement for an information word for the BCH encoding. For instance, when a code length of an information word for the BCH coding is $K_{bch}$ and a code length of the L1-post signaling is $K_{sig}$, the zero padder 210 may pad $K_{bch}-K_{sig}$ number of zero bits to the L1-post signaling.

How the zero padder 210 pads zero bits will be explained below in greater detail.

Figure 3:
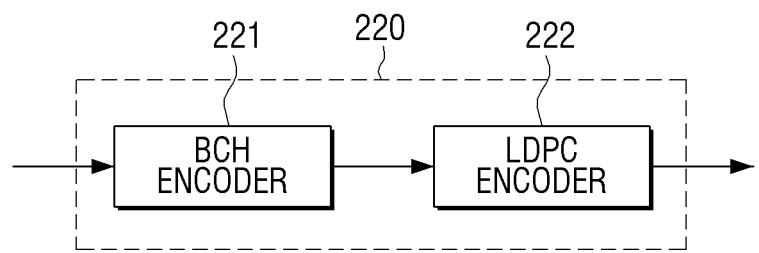
FIG. 3 is a block diagram provided to explain a detailed configuration of an encoder according to an exemplary embodiment.

The encoder 220 encodes an information word. To encode an information word, the encoder 220 may have a BCH encoder 221 and an LDPC encoder 222 as shown in FIG. 3.

The encoder 220 is arranged such that the BCH encoder 221 and the LDPC encoder 222 are concatenated to each other. An output from the zero padder 210 is input into the BCH encoder 221. Thus, an information word generated by padding zero bits to the L1-post signaling may be an information word of a BCH code.

The BCH encoder 221 performs BCH encoding on the L1-post signaling which zero bits are padded to. In addition, the BCH encoder 221 outputs a BCH codeword, generated by the BCH encoding, to an LDPC encoder 222.

Considering that the BCH code is a systematic code, the information word may be included in a BCH codeword as it is. That is, the BCH encoder 221 may perform BCH encoding on an information word as input bits to generate a BCH codeword, and the BCH codeword may be a form in which BCH parity bits are added to input bits which is an information word.

Input bits, which are an L1-post signaling where zero bits are padded, may be formed of the same number of bits as an information word (e.g., $K_{bch}$) of a BCH code.

The LDPC encoder 222 performs LDPC encoding on a BCH codeword to generate an LDPC codeword.

Here, considering that the LDPC code is a systematic code, an information word may be included in the LDPC code as it is. That is, the LDPC encoder 222 may perform LDPC encoding on an LDPC information word as input bits to generate an LDPC codeword, and the LDPC codeword may be a form in which LDPC parity bits are added to input bits which constitute the LDPC information word.

Input bits, which constitute a BCH codeword, may be formed of the same number of bits as an information word of an LDPC code (e.g., $K_{ldpc}$).

A code parameter of the encoder 220 for the L1-post signaling may be defined as shown in Table 1.

TABLE 1

| | $K_{bch}$ | $K_{ldpc}$ |
|---|---|---|
| L1-post signaling | 7392 | 7560 |

Here, $K_{bch}$ is a length of an information word of a BCH code, and $K_{ldpc}$ is a length of an information word of an LDPC code.

LDPC encoding generates an LDPC codeword which satisfies $H \cdot C^T = 0$. Here, H refers to a parity check matrix and C refers to the LDPC codeword. That is, the LDPC encoder 222 may generate an LDPC codeword such that the LDPC codeword multiplied by the parity check matrix makes 0.

The LDPC encoder 222 may generate LDPC codewords with different lengths by performing LDPC encoding according to different code rates. For instance, the LDPC encoder 222 may generate an LDPC codeword composed of 16200 bits by performing LDPC encoding using a code rate of 7/15, etc.

A parity check matrix which is used for LDPC encoding may be defined according to a code rate. Hereinafter, a parity check matrix according to an exemplary embodiment will be explained.

First, a structure of a parity check matrix according to an exemplary embodiment will be explained with reference to FIG. 4.

Figure 4:
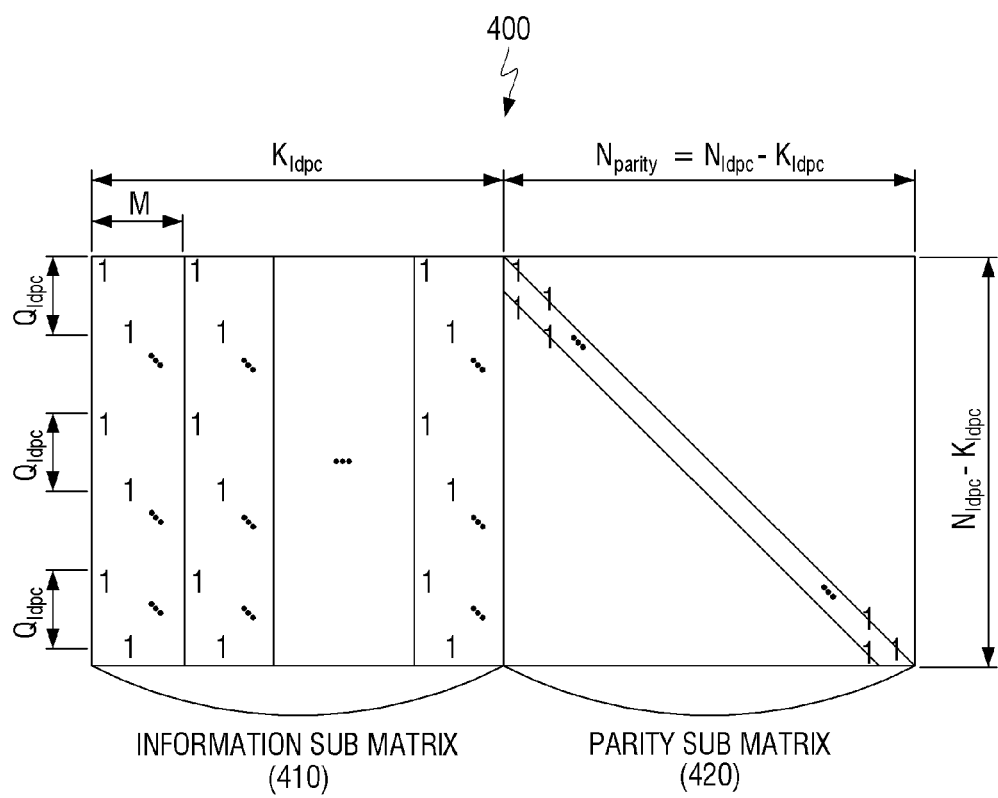
FIG. 4 is a diagram provided to explain a structure of a parity check matrix according to an exemplary embodiment.

Referring to FIG. 4, a parity check matrix 400 includes an information word sub matrix 410 which is a sub matrix corresponding to an information word, and a parity sub matrix 420 which is a sub matrix corresponding to parity bits.

The information word sub matrix 410 includes $K_{ldpc}$ number of columns and the parity sub matrix 420 includes $N_{parity}=N_{ldpc}-K_{ldpc}$ number of columns. The number of rows of the parity check matrix 400 is the same as the number of columns of the parity sub matrix 420, $N_{ldpc}-K_{ldpc}$.

In the parity check matrix 400, $N_{ldpc}$ is a length of an LDPC codeword and $K_{ldpc}$ is a length of an information word. $N_{parity}=N_{ldpc}-K_{ldpc}$ is a length of a parity.

Hereinafter, the structures of the information word sub matrix 410 and the parity sub matrix 420 will be explained in detail. In the information word sub matrix 410 and the parity sub matrix 420, elements other than elements with 1 have 0.

The information word sub matrix 410 which includes a matrix including $K_{ldpc}$ number of columns (i.e., $0^{th}$ to ($K_{ldpc}-1)^{th}$ columns) is configured according to the following rules:

First, M number of columns out of $K_{ldpc}$ number of columns of the information word sub matrix 410 belong to the same group, and $K_{ldpc}$ number of columns are divided into $K_{ldpc}/M$ number of column groups. The columns belonging to the same column group are cyclic-shifted from one another by $Q_{ldpc}$.

M is an interval in which a pattern of a column is repeated in the information word sub matrix 410 (e.g., M=360), and $Q_{ldpc}$ is a size by which each column is shifted in the information word sub matrix 410. M and $Q_{ldpc}$ are integers and are determined to satisfy $Q_{ldpc}=(N_{ldpc}-K_{ldpc})/M$. In this case, $K_{ldpc}/M$ is also an integer. M and $Q_{ldpc}$ may have variables values according to a length of the LDPC codeword and a code rate.

Second, when the degree of $0^{th}$ column of the $i^{th}$ column group is $D_i$ (here, the degree is the number of a value 1 existing in a column and all columns belonging to the same column group have the same degree), and when a position of each row where 1 exists is $R_{i,0}^{(0)}, R_{i,0}^{(1)}, \ldots R_{i,0}^{(D_i-1)}$, an index $R_{i,j}^{(k)}$ of a row where weight-1 is located in the $j^{th}$ column in the $i^{th}$ column group (that is, an index of a row where a value 1 is located in the $j^{th}$ column in the $i^{th}$ column group) is determined by following Equation 1:

$$R_{i,j}^{(k)}=R_{i,(j-1)}^{(k)}+Q_{ldpc} \bmod(N_{ldpc}-K_{ldpc}) \quad \text{[Equation 1]}$$

where k=0, 1, 2, . . . , $D_i$−1, i=0, 1, . . . , $K_{ldpc}$/M, and j=1, 2, . . . , M−1.

Equation 1 may be expressed by Equation 2:

$$R_{i,j}^{(k)}=\{R_{i,0}^{(k)}+(j \bmod M) \times Q_{ldpc}\} \bmod(N_{ldpc}-K_{ldpc}), \quad \text{[Equation 2]}$$

where k=0, 1, 2, . . . , $D_i$−1, i=0, 1, . . . , $K_{ldpc}$/M, and j=1, 2, . . . , M−1.

In above Equations, $R_{i,j}^{(k)}$ is an index of the row where $k^{th}$ weight-1 exists in the $j^{th}$ column of the $i^{th}$ column group, $N_{ldpc}$ is a length of an LDPC codeword, $K_{ldpc}$ is a length of an information word, $D_i$ is a degree of columns belonging to the $i^{th}$ column group, and M is the number of columns belonging to a single column group. $Q_{ldpc}$ is a size by which each column is cyclic-shifted.

Also, according to the above Equations, once $R_{i,0}^{(k)}$ is known, the index of the row where the $k^{th}$ weight-1 is located in the $i^{th}$ column group can be known. Therefore, when the index value of the row where the $k^{th}$ weight-1 is located in the $1^{st}$ column of each column group is stored, a position of column and row where weight-1 is located in the information word sub matrix 410 having the configuration of FIG. 4 can be known.

According to the above-described rules, all of the columns belonging to the $i^{th}$ column group have the same degree $D_i$. Accordingly, the LDPC code which stores information on the parity check matrix according to the above-described rules may be briefly expressed as follows.

For example, when $N_{ldpc}$ is 30, $K_{ldpc}$ is 15, and $Q_{ldpc}$ is 3, position information of the row where weight-1 is located in the $0^{th}$ column of the three column groups may be expressed by a sequence as shown in Equation 3 and may be referred to as 'weight-1 position sequence'.

$$R_{1,0}^{(1)}=1, R_{1,0}^{(2)}=2, R_{1,0}^{(3)}=8, R_{1,0}^{(4)}=10,$$

$$R_{2,0}^{(1)}=0, R_{2,0}^{(2)}=9, R_{2,0}^{(3)}=13,$$

$$R_{3,0}^{(1)}=0, R_{3,0}^{(2)}=14. \quad \text{[Equation 3]}$$

In the above, $R_{i,j}^{(k)}$ is an index of the row where $k^{th}$ weight-1 exists in the $j^{th}$ column of the $i^{th}$ column group.

The weight-1 position sequence indicating the index of the row where 1 exists in the $0^{th}$ column of each column group as in Equation 3 may be expressed more briefly as in Table 2:

TABLE 2

1 2 8 10
0 9 13
0 14

Table 2 shows positions of elements having weight-1, in other words, a value 1, in the parity check matrix, and the ith weight-1 position sequence is expressed by indexes of the rows where weight-1 exists in the $0^{th}$ column belonging to the ith column group.

The parity sub matrix 420 is a sub matrix including $N_{ldpc}-K_{ldpc}$ number of columns (that is, $K_{ldpc}^{th}$ column to $(N_{lpdc}-1)^{th}$ column), and has a dual diagonal configuration. Accordingly, the degree of columns except the last column (that is, $(N_{ldpc}-1)^{th}$ column) out of the columns included in the parity sub matrix 420 is 2, and the degree of the last column (that is, $(N_{ldpc}-1)^{th}$ column) is 1.

Hereinafter, a detailed structure of a parity check matrix used for LDPC encoding according to an exemplary embodiment will be explained.

Specifically, when a length of an LDPC codeword, $N_{ldpc}$, is 16200, a length of an information word, $K_{ldpc}$ is 7560, a code rate is 7/15, and M is 360, a parity check matrix may be defined as in Table 3.

TABLE 3

| i | index of rows where 1 exists in a $0^{th}$ group in the $i^{th}$ column group |
|---|---|
| 0 | 432 655 893 942 1285 1427 1738 2199 2441 2565 2932 3201 4144 4419 4678 4963 5423 5922 6433 6564 6656 7478 7514 7892 |
| 1 | 220 453 690 826 1116 1425 1488 1901 3119 3182 3568 3800 3953 4071 4782 5038 5555 6836 6871 7131 7609 7850 8317 8443 |

TABLE 3-continued

| i | index of rows where 1 exists in a $0^{th}$ group in the $i^{th}$ column group |
|---|---|
| 2 | 300 454 497 930 1757 2145 2314 2372 2467 2819 3191 3256 3699 3984 4538 4965 5461 5742 5912 6135 6649 7636 8078 8455 |
| 3 | 24 65 565 609 990 1319 1394 1465 1918 1976 2463 2987 3330 3677 4195 4240 4947 5372 6453 6950 7066 8412 8500 8599 |
| 4 | 1373 4668 5324 7777 |
| 5 | 189 3930 5766 6877 |
| 6 | 3 2961 4207 5747 |
| 7 | 1108 4768 6743 7106 |
| 8 | 1282 2274 2750 6204 |
| 9 | 2279 2587 2737 6344 |
| 10 | 2889 3164 7275 8040 |
| 11 | 133 2734 5081 8386 |
| 12 | 437 3203 7121 |
| 13 | 4280 7128 8490 |
| 14 | 619 4563 6206 |
| 15 | 2799 6814 6991 |
| 16 | 244 4212 5925 |
| 17 | 1719 7657 8554 |
| 18 | 53 1895 6685 |
| 19 | 584 5420 6856 |
| 20 | 2958 5834 8103 |

Table 3 indicates an index of the row where 1 exists in the 0th column of the $i^{th}$ column group.

That is, the information sub matrix is formed of 21 number of column groups each including 360 columns, and the position of a value 1 in the $0^{th}$ column of each column group may be defined by Table 3. For instance, in case of the $0^{th}$ column of the $0^{th}$ column group, the value 1 may exist in the $432^{th}$ row, $655^{th}$ row, $893^{th}$ row, etc.

In addition, by shifting the row where 1 is located in the $0^{th}$ column of each column group by $Q_{ldpc}$, a row where 1 is located in another column of the corresponding column group may be defined.

Specifically, in case of Table 3, since $Q_{ldpc}=(N_{ldpc}-K_{ldpc})/M=(16200-7560)/360=24$ and the indexes of rows where 1 is located in the $0^{th}$ column of the $0^{th}$ column group are 432, 655, 893, . . . , indexes of rows where 1 is located in the $1^{st}$ column of the $0^{th}$ column group are 456 (=432+24), 679 (=655+24), 917 (=893+24), . . . , and indexes of rows where 1 is located in the $2^{nd}$ column of the $0^{th}$ column group are 480 (=456+24), 703 (=679+24), 941 (=917+24) . . . .

Considering that a parity check matrix defined in Table 3 has a structure as in Table 4, a parity check matrix may have a dual diagonal structure.

A transmitter 200 may prestore information on a parity check matrix in its memory (not illustrated).

Hereinafter, how a zero padder 210 pads zero bits will be explained in detail.

The zero padder 210 may divide an information word into a plurality of groups to pad zero bits to at least one of the plurality of groups by group unit, and pad additional zero bits, starting from a front end or a back end of at least one of the plurality of groups remaining after the zero bits are padded to at least one of the plurality of groups, based on a predetermined criterion. Here, the information word may have a length required for BCH encoding or LDPC encoding. In this regard, the zero padder 210 may be described as constructing an information word to have a plurality of groups to satisfy the length requirement for the BCH encoding or the LDPC encoding, and padding zero bits to at least one of these groups by group unit based on the predetermined criterion.

In order to pad zero bits and additional zero bits, the zero padder 210 may divide an information word into a plurality of groups. Specifically, the zero padder 210 may calculate the number of groups constituting the information word based on the number of bits of the information word and divide the information word into a plurality of groups based on the calculated number of groups.

For instance, the zero padder 210 may divide an information word (i0, i1, . . . , i $K_{bch}$-1) into $N_{group}$ number of groups based on Equation 4 or 5 below.

$$Z_j = \left\{ i_k \mid j = \left\lfloor \frac{k}{360} \right\rfloor, 0 \le k < K_{bch} \right\} \quad \text{[Equation 4]}$$

for $0 \le j < N_{group}$ $$Z_j = \{i_k \mid 360 \times j \le k < 360 \times (j+1), 0 \le k \le K_{bch}\} \quad \text{[Equation 5]}$$

for $0 \le j \le N_{group}$ where $Z^j$ is the $j^{th}$ group, and $K_{bch}$ is a length of an information word of a BCH code. $\lfloor x \rfloor$ refers to a greatest integer which is less than x. For instance, $\lfloor 1.2 \rfloor=1$.

Figure 5:
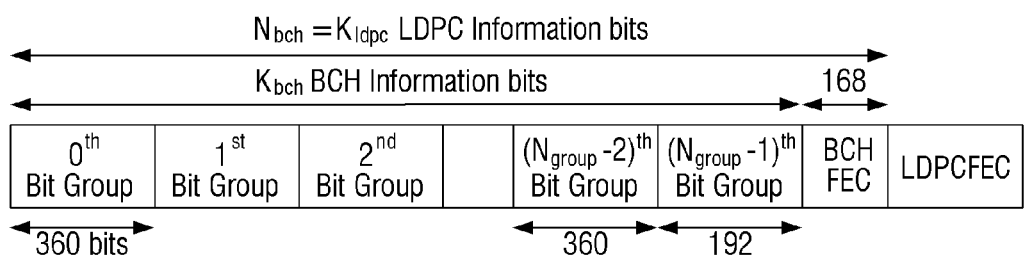
FIG. 5 is a diagram provided to explain an information word divided into a plurality of groups according to an exemplary embodiment.

When a code parameter is as shown in Table 1, an information word which is divided into a plurality of groups may be expressed as in FIG. 5.

Referring to FIG. 5, when an information word is divided into $N_{group}$ number of groups. Here, a code parameter is as shown in Table 1, $N_{group}$ may be 21.

$Z_j$, which is the $j^{th}$ group satisfying $0 \le j \le N_{group}-2$ out of the $N_{group}$ number of groups, is formed of 360 bits and Z $N_{group}-1$, which is the last group, is formed of 192 (=360-($K_{ldpc}-K_{bch}$)=360-(7560-7392)) bits.

FIG. 5 illustrates BCH parity bits (BCF FEC) and LPDC parity bits (LDPC FEC) together. In this case, the BCH parity bits may be formed of 168 bits, and LPDC parity bits may be formed of different number of bits depending on a code rate. For instance, when a length of an LDPC codeword, $N_{ldpc}$, is 16200, a length of an information word, $K_{ldpc}$, is 7560, and a code rate is 7/15, a LDPC parity bit may be formed of 8640 (=16200-7560).

Then, the zero padder 210 calculates the number of zero bits padded to an L1-post signaling.

Specifically, the zero padder 210 may calculate, as the number of padded zero bits, the difference between a length of an information word of a BCH code and a length of the L1-post signaling. For instance, when a length of an information word of a BCH code is $K_{bch}$, and a length of the L1-post signaling is $K_{sig}$, the number of padded zero bits may be $K_{bch}-K_{sig}$.

Considering that the zero padder 210 pads zero bits to the L1-post signaling by group unit, the zero padder 210 may calculate the number of groups of the padded zero bits.

In this case, the zero padder 210 may calculate the number of groups of the padded zero bits based on the number of groups constituting the information word and the number of padded zero bits.

Specifically, if the number of bits constituting the L1-post signaling is not more than the number of bits included in one of the plurality of groups constituting the information word, the zero padder 210 may calculate the number of groups of the padded zero bits based on following Equation 6. Here, the number of bits included in one of the plurality of groups may be 360.

$$N_{pad}=N_{group}-1, \quad \text{[Equation 6]}$$

where $N_{pad}$ is the number of groups of padded zero bits and $N_{group}$ is the number of groups constituting an information word.

That is, if the number of bits constituting an L1-post signaling is $K_{sig}$, and the zero padder 210 satisfies $0 < K_{sig} \leq 360$, the zero padder 210 may calculate $N_{pad}$, which is the number of groups of the padded zero bits, by subtracting 1 from the number of groups constituting the information word, $N_{group}$.

If the number of bits constituting the L1-post signaling exceeds the number of bits included in one of the plurality of groups, the zero padder 210 may calculate the number of groups of the padded zero bits based on following Equation 7. Here, the number of bits included in one of the plurality of groups may be 360.

$$N_{pad} = \left\lfloor \frac{K_{bch} - K_{sig}}{360} \right\rfloor, \quad \text{[Equation 7]}$$

where $N_{pad}$ is the number of groups of the padded zero bits, $K_{bch}$ is the number of bits constituting an information word, and $K_{sig}$ is the number bits constituting an L1-post signaling, and $K_{bch}-K_{sig}$ is the number of padded zero bits. $\lfloor x \rfloor$ refers to a greatest integer which is less than x. For instance, $\lfloor 1.2 \rfloor = 1$.

That is, when $K_{sig} > 360$ is satisfied, the zero padder 210 may calculate $N_{pad}$, which is the number of groups of the padded zero bits, by taking a greatest integer which is less than a value obtained by dividing ($K_{bch}-K_{sig}$), which is the number of padded zero bits by the number of bits included in one group, 360.

The zero padder 210 calculates the number of groups of the padded zero bits using the above-described method for the following reasons.

Referring to FIG. 5, if the number of bits of L1-post signaling is not more than 360, so long as the L1-post signaling is not located in the $N_{group}-1$ group, the L1-post signaling may be mapped in one group. Thus, since zero bits may be padded by group unit to all groups except a group where the L1-post signaling is located, the zero padder 210 calculates the number of groups where zero bits are padded by subtracting 1 from the number of groups constituting an information word. On the other hand, if the number of bits constituting L1-post signaling exceeds 360, since the L1-post signaling is located in at least two groups, the zero padder 210 calculates the number of groups where zero bits are padded, by dividing the number of padded zero bits by the number of bits included in one group.

Afterwards, the zero padder 210 may determine a position of a group where zero bits are padded out of a plurality of groups based on a predetermined shortening pattern, and pad the zero bits to the determined position by group unit.

In this case, the predetermined shortening pattern may be defined as in Table 4.

In Table 4, $\pi s(j)$ indicates the $j^{th}$ group where zero bits are padded out of a plurality of groups constituting an information word. Thus, $\pi s(j)$ may be referred to as an order of shortening pattern.

$\pi s(j)$ may be defined differently depending on a modulation method and a code rate of an LDPC code. For instance, a different shortening pattern order may apply to the following three cases: a case where a modulation method is BPSK (binary phase shift keying) or QPSK (quadrature phase shift keying) and a code rate is 7/15; a case where a modulation method is 16-QAM (quadrature amplitude modulation) and a code rate is 7/15; and a case where a modulation method is 64-QAM and a code rate is 7/15, as in Table 4.

Zero bits may be padded by group unit using a shortening pattern as shown in above Table 4.

When the calculated number of groups of the padded zero bits is $N_{pad}$, the zero padder 210 may pad zero bits to $0^{th}$ group in case of $\pi_s(0)$, to $1^{st}$ group in case of $\pi_s(1)$ ... $(N_{pad}-1)^{th}$ group in case of $\pi_s(N_{pad}-1)$. For instance, when 4 corresponds to a $j^{th}$ group in an information word, the zero padder 210 may determine a $Z \pi_s(0)_{th}$ group, a $Z \pi_s(1)_{th}$ group, ..., a $Z \pi_s(N_{pad}-1)_{th}$ group as groups where zero bits are padded, and pad zero bits to the corresponding groups by group unit.

In this case, the zero padder 210 may pad zero bits as many as the number of bits which are included in each group, to the corresponding groups. That is, considering that $Z_j$, $j^{th}$ group which satisfies $0 \leq j \leq N_{group} 2$, out of $N_{group}$ number of groups, is formed of 360 bits, a group of 360 zero bits may be padded to each of the corresponding groups, and considering that the last group is formed of 192 bits, 192 zero bits may be padded to the last group.

Afterwards, the zero padder 210 may calculate the number of additional zero bits and pad zero bits as many as the calculated bits. The additional zero bits may be bits which are left after sequentially padding the entire zero bits to be padded to each group by group unit as many as the number of bits included in each group. Thus, the number of the additional zero bits may be less than that of bits included in one group to be padded.

Groups where additional zero bits are padded may be determined by a predetermined shortening pattern. Specifically, when the number of groups of the padded zero bits is $N_{pad}$, a group where additional zero bits are padded may be $\pi_s(N_{pad})$.

For instance, if the number of groups of the padded zero bits, $N_{pad}$, is 2, a modulation method is BPSK and a code rate is 7/15. In this case, when following a shortening pattern as in above Table 4, a group of 360 zero bits is padded in each of $4(=\pi_s(0))^{th}$ group and $5(=\pi_s(1))^{th}$ group. Thus, the number of additional zero bits may be $K_{bch}-K_{sig}-(2\times360)$ number of bits, i.e., the number of all of the padded zero bits, $K_{bch}-K_{sig}$, less the number of zero bits padded in the fourth and fifth

TABLE 4

| Modulation and code rate | | $N_{group}$ | $\pi_s(0)$ $\pi_s(11)$ | $\pi_s(1)$ $\pi_s(12)$ | $\pi_s(2)$ $\pi_s(13)$ | $\pi_s(3)$ $\pi_s(14)$ | $\pi_s(4)$ $\pi_s(15)$ | $\pi_s(5)$ $\pi_s(16)$ | $\pi_s(6)$ $\pi_s(17)$ | $\pi_s(7)$ $\pi_s(18)$ | $\pi_s(8)$ $\pi_s(19)$ | $\pi_s(9)$ $\pi_s(20)$ | $\pi_s(10)$ |
|---|---|---|---|---|---|---|---|---|---|---|---|---|---|
| BPSK/QPSK | 7/15 | 21 | 4 | 5 | 6 | 7 | 8 | 9 | 3 | 12 | 13 | 14 | 15 |
| | | | 2 | 16 | 17 | 18 | 1 | 10 | 19 | 11 | 20 | 0 | |
| 16-QAM | 7/15 | 21 | 4 | 5 | 12 | 13 | 14 | 15 | 16 | 17 | 18 | 6 | 7 |
| | | | 3 | 8 | 9 | 2 | 10 | 1 | 19 | 11 | 20 | 0 | |
| 64-QAM | 7/15 | 21 | 12 | 4 | 13 | 5 | 14 | 6 | 15 | 7 | 8 | 3 | 9 |
| | | | 10 | 11 | 2 | 16 | 17 | 1 | 18 | 19 | 20 | 0 | |
| 256-QAM | 7/15 | 21 | 4 | 12 | 13 | 3 | 14 | 15 | 5 | 16 | 17 | 6 | 18 |
| | | | 7 | 2 | 8 | 19 | 1 | 9 | 10 | 11 | 20 | 0 | | groups. A group where additional zero bits are padded is $6(=\pi_s(2))^{th}$ group. $K_{bch}-K_{sig}-(2\times 360)$ is less than the number of bits included in the $6^{th}$ group, 360.

The zero padder 210 may pad additional zero bits using different methods depending on whether $N_{pad}$ satisfies a predetermined criterion. Here, different methods include a method by which additional zero bits are padded, starting from a front end or a back end of a group.

That is, the zero padder 210 may pad additional zero bits by group unit based on a predetermined criterion, starting from a front end or a later end of one of a plurality of groups.

Specifically, if the number of groups of the padded zero bits, $N_{pad}$, satisfies a predetermined first criterion, the zero padder 210 may determine $\pi_s(N_{pad})^{th}$ group as a group where additional zero bits are padded based on above Table 4, and may pad the additional zero bits in sequence, starting from the back end of the $\pi_s(N_{pad})^{th}$ group.

Here, the first predetermined criterion may be that if the number of groups constituting an information word is $N_{group}$, $N_{pad}=N_{group}-1$. When the number of bits included in one of a plurality of groups is 360, and the number of bits constituting the L1-post signaling is $K_{sig}$, the number of additional zero bits may be $360-K_{sig}$.

For instance, if the number of groups constituting an information word, $N_{group}$, is 21, the number of groups of the padded zero bits, $N_{pad}$, is 20, a modulation method is QPSK, and a code rate is 7/15. In this case, since $N_{group}-N_{pad}=1$ is satisfied, it can be said that the first criterion is satisfied. According to above Table 4, since a group where additional zero bits are padded is $0(=\pi s(20))^{th}$ group, additional zero bits may be padded to $0^{th}$ group.

Here, the zero padder 210 may pad zero bits to bits in sequence, starting from the last bit of the 360 bits constituting the $0^{th}$ group. For instance, if the number of additional zero bits is 200, the zero padder 210 may arrange a total of 200 zero bits to $i_0, i_1, \ldots, i_{358}, i_{359}$ constituting the $0^{th}$ group, in an order of $i_{359}, i_{358}, \ldots, i_{161}, i_{160}$. Thus, in the $0^{th}$ group, zero bits are padded to the last 200 bits of the 360 bits.

If the number of groups of the padded zero bits, $N_{pad}$, satisfies a predetermined second criterion, the zero padder 210 may determine $\pi_s(N_{pad})^{th}$ group as a group where additional zero bits are padded based on above Table 4, and pad additional zero bits in sequence to bits, starting from the back end of the $\pi_s(N_{pad})^{th}$ group.

Here, a predetermined second criterion may be that if the number of groups constituting an information word is $N_{group}$, $\pi_s(N_{pad})$ is less than a predetermined value (here, the predetermined value may be, for example, 4) and $N_{pad}<N_{group}-1$ is satisfied. Also, if the number of bits included in one of a plurality of groups is 360, the number of bits constituting an L1-post signaling is $K_{sig}$, and the number of bits constituting the information word is $K_{bch}$, the number of the additional zero bits may be $K_{bch}-K_{sig}-360\times N_{pad}$.

For instance, the number of groups constituting an information word, $N_{group}$, is 21, the number of groups of the padded zero bits, $N_{pad}$, is 11, a modulation method is QPSK and a code rate is 7/15. In this case, since $N_{pad}<N_{group}-1$ is satisfied and $2(=\pi_s(11))<4$ is satisfied according to Table 4, the second criterion is satisfied. Since a group where additional zero bits are padded is $2(=\pi_s(10))^{nd}$ group based on Table 4, additional zero bits may be padded to $2^{nd}$ group.

Here, the zero padder 210 may pad zero bits to bits in sequence, starting from the last bit of 360 bits constituting $15^{th}$ group. For instance, when the number of additional zero bits is 200, the zero padder 210 may arrange a total of 200 zero bits to $i_{720}, i_{721}, \ldots, i_{1078}, i_{1079}$ constituting the $0^{th}$ group, in an order of $i_{1079}, i_{1078}, \ldots, i_{881}, i_{880}$. Thus, in the $2^{nd}$ group, zero bits are padded to the last 200 bits of the 360 bits.

If the number of groups of padded zero bits, $N_{pad}$, does not satisfy a predetermined first and second criteria, the zero padder 210 may determine a $\pi_s(N_{pad})^{th}$ group as a group where additional zero bits are padded based on above Table 4, and pad additional zero bits in sequence to bits, starting from the front end of the $\pi_s(N_{pad})^{th}$ group.

Here, if the number of bits included in one of a plurality of groups is 360, the number of bits constituting an L1-post signaling is $K_{sig}$, and the number of bits constituting the information word is $K_{bch}$, the number of the additional zero bits may be $K_{bch}-K_{sig}-360\times N_{pad}$.

For instance, the number of groups constituting an information word, $N_{group}$, is 21, the number of groups of padded zero bits, $N_{pad}$, is 10, a modulation method is QPSK, and a code rate is 7/15. In this case, since $N_{pad}<N_{group}-1$ is satisfied and $15(=\pi s(10))>4$ is satisfied according to Table 4, the first and second criteria are not satisfied. According to Table 4, since a group where additional zero bits are padded is 15 $(=\pi_s(10))^{th}$ group, additional zero bits may be padded to $15^{th}$ group.

Here, the zero padder 210 may pad zero bits in sequence to bits, starting from the first bit of 360 bits constituting the $15^{th}$ group. For instance, if the number of additional zero bits is 200, the zero padder 210 may arrange a total of 200 additional zero bits to bits, $i_{5400}, i_{5401}, \ldots, i_{5758}, i_{5759}$ constituting the $15^{th}$ group, in an order of $i_{5400}, i_{5401}, \ldots, i_{5598}, i_{5599}$. Thus, in the $15^{th}$ group, zero bits are padded to the first 200 bits of the 360 bits.

After zero bits are padded in the methods described above, the zero padder 210 may locate the L1-post signaling to an information word to generate an information word.

Specifically, the zero padder 210 may pad the L1-post signaling in sequence to a position where zero bits are not padded in the information word to generate the information word.

For instance, when zero bits are located in $i_{200}, i_{201}, \ldots, i K_{bch}-2, i K_{bch}-1$ in an information word $i_0, i_1, \ldots, i K_{bch}-1$, the zero padder 210 may locate the L1-post signaling formed of 200 bits in sequence to $i_0, i_1, \ldots, i_{198}, i_{199}$. In this case, if the L1-post signaling is $s_0, s_1, \ldots, s_{198}, s_{199}$, the information word may be constituted, for example, $(i_0, i_1, \ldots, i K_{bch}-1)=s_0, s_1, \ldots, s_{198}, s_{199}, 0, 0, \ldots, 0, 0)$.

Hereinafter, referring to FIGS. 6 and 7, a method of generating an information word will be explained with a detailed example. Code parameters used in FIGS. 6 and 7 are as shown in Table 1, and BCH FEC refers to BCH parity bits added to an information word by BCH encoding.

Figure 6:
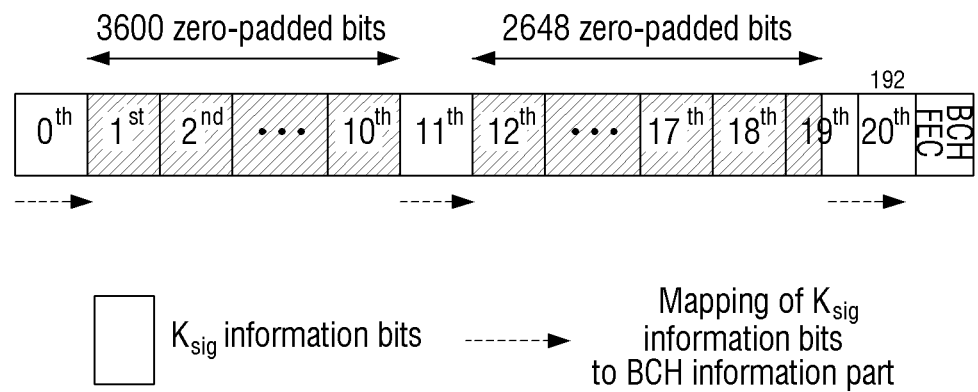
FIGS. 6 to 8 are diagrams provided to explain detailed examples and effects of a method of generating an information word according to an exemplary embodiment.
Figure 7:
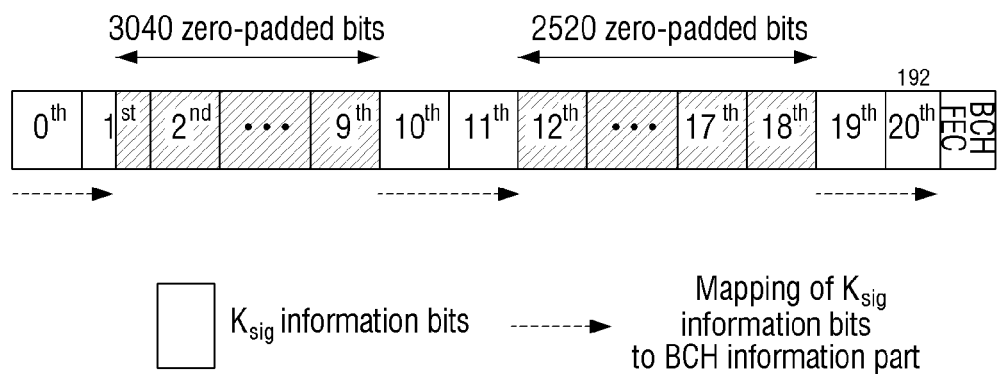

First, FIG. 6 shows a case where the number of bits constituting an L1-post signaling, $K_{sig}$, is 1144, a modulation method is QPSK, and a code rate is 7/15.

In this case, the number of padded zero bits is 6248 $(=K_{bch}-K_{sig}=7392-1144)$. Also, since $1144(=K_{sig})>360$ is satisfied, the number of groups of padded zero bits according to Equation 7, $N_{pad}$, is 17.

Considering that a modulation method is QPSK, and a code rate is 7/15, indexes of groups where zero bits are padded according to Table 4 are $4(=\pi_s(0)), 5(=\pi_s(1)), 6(=\pi_s(2)), 7(=\pi_s(3)), 8(=\pi_s(4)), 9(=\pi_s(5)), 3(=\pi_s(6)), 12(=\pi_s(7)), 13(=\pi_s(8)), 14(=\pi_s(9)), 15(=\pi_s(10)), 2(=\pi_s(11)), 16(=\pi_s(12)), 17(=\pi_s(13)), 18(=\pi_s(14)), 1(=\pi_s(15)), 10(=\pi_s(16))$.

Therefore, the zero padder 210 may pad a group of 360 zero bits to each group in an order of $4^{th}$ group, $5^{th}$ group, $\ldots, 1^{st}$ group, $10^{th}$ group among a plurality of groups.

Since $17(=N_{pad})<20(=N_{group}-1)$ and $19(=\pi s(17))>4$ are satisfied, additional zero bits are padded to a $19(=\pi_s(17))^{th}$ group, starting from the front end of the $19(=\pi_s(17))^{th}$ group in sequence. In this case, the number of additional zero bits is $128(=K_{bch}-K_{sig}-360\times N_{pad}=7392-1144-360\times17)$.

Accordingly, the zero padder 210 may pad 128 additional zero bits in sequence, starting from the front end of $19^{th}$ group.

After padding zero bits by the above-described methods, the zero padder 210 may locate the L1-post signaling to bits which constitute an information word and to which zero bits are not located. That is, the zero padder 210 may locate the L1-post signaling to all bits belonging to $0^{th}$ group, all bits belonging to $11^{th}$ group, bits which belongs to $19^{th}$ group and to which additional zero bits are not located, and all bits belonging to $20^{th}$ group.

In this case, only the $20^{th}$ group is formed of 192 bits, and all groups except the $20^{th}$ group are formed of 360 bits. The number of bits which belong to the $19^{th}$ group and to which additional zero bits are not located is 232. Thus, an L1-post signaling with 1144 (=360+360+232+192) bits may be located to an information word.

FIG. 7 shows a case where the number of bits constituting the L1-post signaling, $K_{sig}$, is 1832, a modulation method is QPSK, and a code rate is 7/15.

In this case, the number of padded zero bits is 5560 $(=K_{bch}-K_{sig}=7392-1832)$. Also, since $1144(=K_{sig})>360$ is satisfied, the number of groups of padded zero bits according to Equation 7, $N_{pad}$, is 15.

Considering that a modulation method is 7/15, the indexes of the groups where zero bits according to Table 4 are padded are $4(=\pi_s(0))$, $5(=\pi_s(1))$, $6(=\pi_s(2))$, $7(=\pi_s(3))$, $8(=\pi_s(4))$, $9(=\pi_s(5))$, $3(=\pi_s(6))$, $12(=\pi_s(7))$, $13(=\pi_s(8))$, $14(=\pi_s(9))$, $15(=\pi_s(10))$, $2(=\pi_s(11))$, $16(=\pi_s(12))$, $17(=\pi_s(13))$, $18(=\pi_s(14))$.

Thus, the zero padder 210 may pad 360 zero bits to each group in an order of $4^{th}$ group, $5^{th}$ group, ..., $17^{th}$ group, $18^{th}$ group among a plurality of groups constituting an information word.

Since $15(=N_{pad})<20(=N_{group}-1)$ and $1(=\pi_s(15))<4$ are satisfied, additional zero bits may be padded to $1(=\pi_s(15))^{st}$ group in sequence, starting from the back end of the $1(=\pi_s(15))^{st}$ group). In this case, the number of additional zero bits is 160 $(=K_{bch}-K_{sig}-360\times N_{pad}=7392-1832-360\times15)$.

Accordingly, the zero padder 210 may pad 160 additional zero bits, starting from the back end of the $15^{th}$ group in sequence.

After padding zero bits by the above described methods, the zero padder 210 may locate the L1-post signaling to bits which constitute an information word and to which zero bits are not located. That is, the zero padder 210 may locate the L1-post signaling to all bits belonging to $0^{th}$ group, bits which belongs to $1^{st}$ group and to which additional zero bits are not located, all bits belonging to $10^{th}$ group, all bits belonging to $11^{th}$ group, all bits belonging to $19^{th}$ group, and all bits belonging to $20^{th}$ group.

In this case, only the $20^{th}$ group is formed of 192 bits, and all groups except the 20th group is formed of 360 bits. The number of bits which belongs to the $1^{st}$ group and to which additional zero bits are not located is 200. Thus, the L1-post signaling having 1832 (=360+200+360+360+360+192) number of bits is located to the information word.

Meanwhile, zero bits are padded by the above-described methods for the following reasons.

For instance, referring to FIG. 6, which illustrates an exemplary embodiment of padding zero bits, additional zero bits are located in sequence, starting from the front end of the $19^{th}$ group. In this case, the bits which belong to the $19^{th}$ group and to which additional zero bits are not located are connected to bits belonging to the $20^{th}$ group.

Accordingly, once a position of a bit which belongs to the $19^{th}$ group and to which an additional zero bit is not located is known, the L1-post signaling may be located to bits in sequence, starting from the bits which belong to the 19th group and to which additional zero bits are not located, such that the L1-post signaling may be located through to the $20^{th}$ group.

Figure 8:
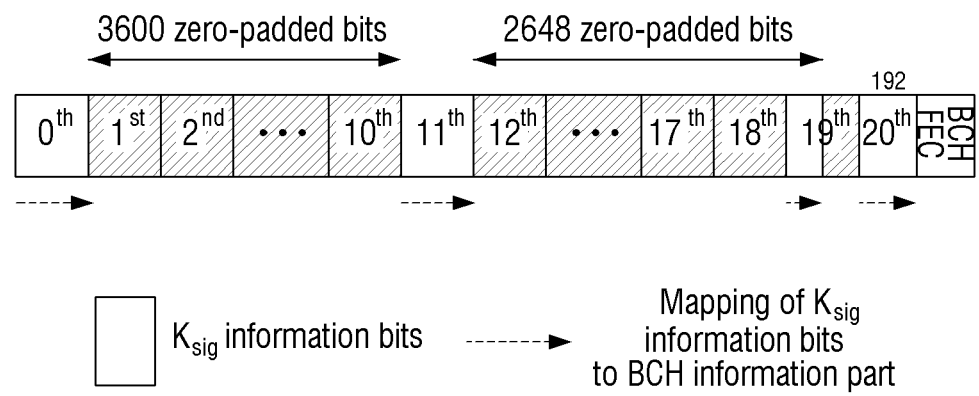

By comparison, when additional zero bits are located, starting from the back end of the $19^{th}$ group as in FIG. 8, only when not only a position of a bit which belongs to the 19th group and to which additional zero bits are not located but also a position where a first bit which belongs to the $20^{th}$ group is positioned are known, the L1-post signaling can be located both in the $19^{th}$ and in the $20^{th}$ group, which would make the arithmetic operations more complicated, compared with the exemplary embodiment illustrated in FIG. 6.

As shown below, by adjusting where additional zero bits start to be located, an information word can be generated using more simple arithmetic operations.

The transmitter 200 may modulate an LDPC codeword output from the encoder 220 and transmit the modulated LDPC codeword to a receiver (not illustrated).

Specifically, the transmitter 200 may map LDPC codeword bits onto constellation points based on BPSK, QPSK, 16-QAM, 64-QAM, 256-QAM, etc. to generate modulation symbols and map the modulation symbols to an OFDM frame using an OFDM method to transmit the mapped modulation symbols to the receiver.

In this case, padded zero bits are removed, and thus, are not transmitted to the receiver. As shown above, when padded zero bits that have not yet been encoded are removed after the encoding, the process is referred to as shortening, and the padded zero bits are not transmitted by means of shortening.

Figure 9:
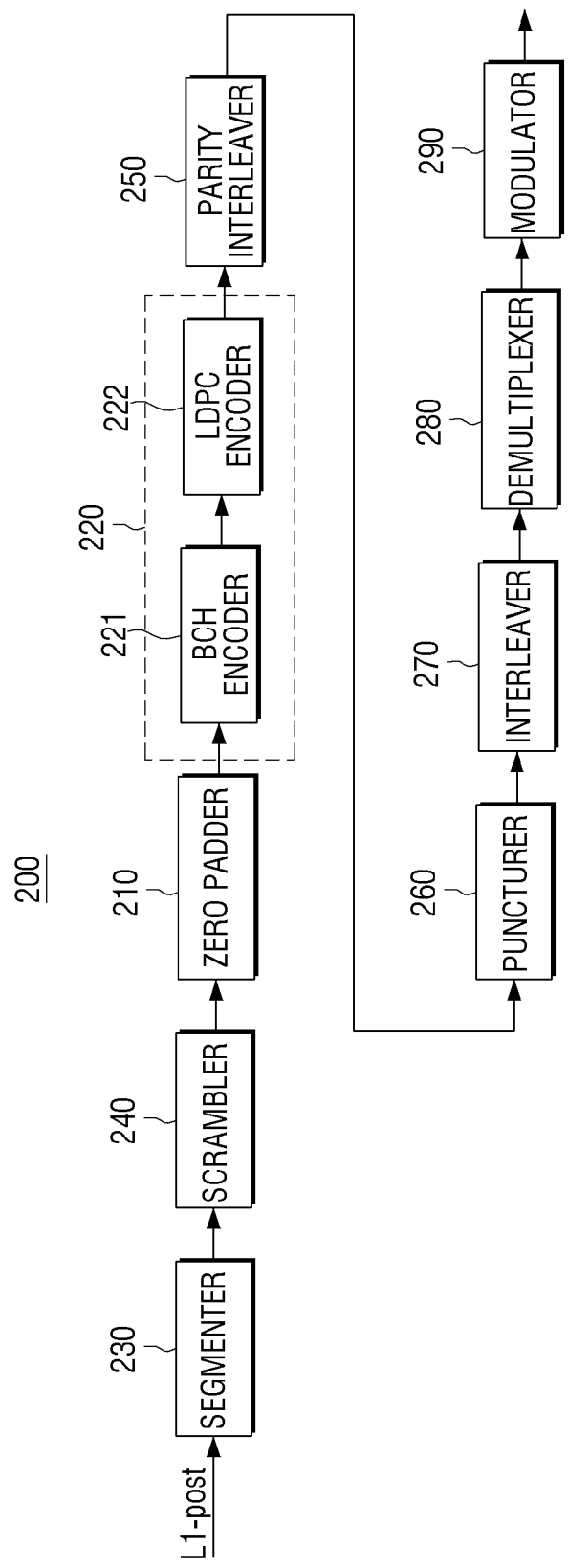
FIG. 9 is a block diagram provided to explain a detailed configuration of a transmitter according to an exemplary embodiment.

FIG. 9 is a block diagram provided to explain a detailed configuration of a transmitter according to an exemplary embodiment. Referring to FIG. 9, the transmitter 200 may further include a segmenter 230, a scrambler 230, a parity interleaver 250, a puncturer 260, an interleaver 270 and a modulator 280 in addition to a zero padder 210 and an encoder 220. Here, considering that the zero padder 210 and the encoder 220 have been explained in FIGS. 2 to 8, a detailed explanation on the zero padder 210 and the encoder 220 is omitted.

The segmenter 230 segments an L1-post signaling and outputs the segmented L1 signalings to a scrambler 240.

Specifically, the segmenter 230 may segment the L1-post signaling so that a segmented L1-post signaling to have bits equal to or less than a predetermined number of bits and output the segmented L1-post signaling (or, L1-post block) to the scrambler 240. In this case, the predetermined number may be lower than the number of a length of an information word that can be encoded by the encoder 220.

The scrambler 240 scrambles the segmented L1-post signaling. That is, the scrambler 240 may randomize bits constituting the segmented L1-post signaling and output the randomized L1-post signaling to the zero padder 210.

Accordingly, the zero padder 210 pads zero bits to the L1-post signaling output from the scrambler 240 and outputs the L1-post signaling, where zero bits are padded, to the encoder 220. The encoder 220 may perform BCH encoding and LDPC encoding using bits which are output from the zero padder 210 as an information word to generate an LDPC codeword and output the LDPC codeword to a parity interleaver 250.

The parity interleaver 250 receives the LDPC codeword from the encoder 220 and performs interleaving with respect to LDPC parity bits constituting the LDPC codeword. The parity interleaver 250 outputs the parity-interleaved LDPC codeword to a puncturer 260.

Specifically, the parity interleaver 250 may interleave only LDPC parity bits out of LDPC codeword $C=(c_0, c_1, \ldots, c\,N_{ldpc}-1)$ output from the encoder 220 based on Equation 8 and output the parity-interleaved LDPC codeword $U=(u_0, u_1, \ldots, u\,N_{ldpc}-1)$ to the puncturer 260.

$$u_i = c_i \text{ for } 0 \le i < K_{ldpc} \quad \text{[Equation 8]}$$
$$u_{K_{ldpc}+M\cdot t+s} = c_{K_{ldpc}+Q_{ldpc}\cdot s+t}$$
$$\text{for } 0 \le s < M, 0 \le t < Q_{ldpc},$$

where M is an interval in which a pattern of a column is repeated in an information word sub matrix, i.e., the number of columns included in a column group, and $K_{ldpc}$ is the number of bits of an LDPC information word.

For instance, when LDPC encoding is performed based on a parity check matrix defined in Table 3, $K_{ldpc}=7560$, $M=360$, $Q_{ldpc}=24$ may be satisfied.

The puncturer 260 puctures at least some of LDPC parity bits constituting an LDPC codeword. Here, since puncturing refers to removing and then not transmitting some of parity bits, punctured LDPC parity bits may not be transmitted. For instance, the puncturer 260 may puncture a specific value of LDPC parity bits, in consideration of a code rate, the number of bits of LDPC parity bits, etc.

The puncturer 260 may remove the zero bits padded by the zero padder 210. That is, the puncturer 260 performs a shortening operation and padded zero bits are not transmitted by shortening.

Figure 10:
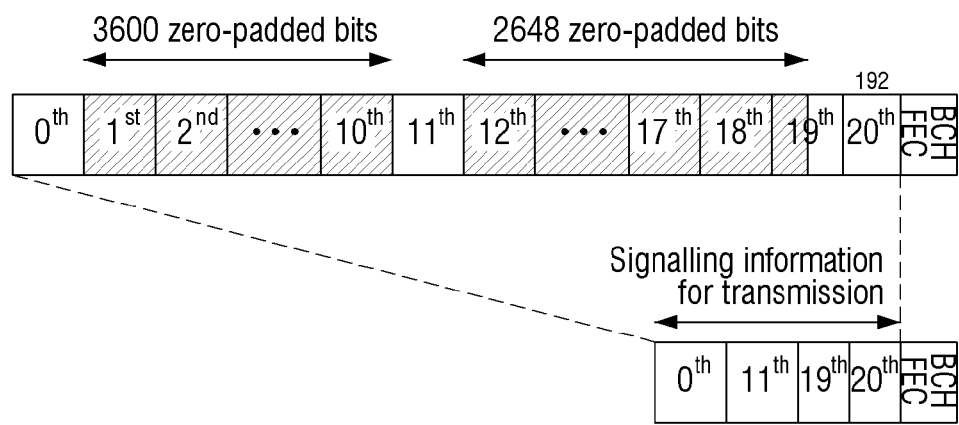
FIG. 10 is a block diagram provided to explain a shortening operation according to an exemplary embodiment, and, and FIG. 11 is a block diagram provided to explain a configuration of a transmitter according to another exemplary embodiment.

Specifically, the puncturer 260 may remove $K_{bch}-K_{sig}$ number of zero bits padded by the zero padder 210. For instance, when zero bits are padded by the methods explained in FIG. 6, the puncturer 260 may remove $K_{bch}-K_{sig}$ number of zero bits padded between the L1-post signaling and BCH parity bits, as described in FIG. 10.

Accordingly, only $K_{sig}$ number of L1-post signaling bits (i.e., signaling information in FIG. 10), 168 BCH parity bits, and $N_{ldpc}-K_{ldpc}-N_{punc}$ number of LDPC parity bits are left. $N_{punc}$ refers to the number of punctured bits.

As shown above, the puncturer 260 punctures at least some of LDPC parity bits in the LDPC codeword, remove zero bits padded by the zero padder 210 and then outputs resultant LDPC codeword bits to the interleaver 270.

The interleaver 270 interleaves the bits output from the puncturer 240 and outputs the interleaved bits to the demultiplexer 280. In this case, the interleaver 270 may interleave the bits output from the puncturer 260 by using $N_c$ number of columns each including $N_r$ number of rows.

Specifically, the interleaver 270 may perform interleaving by writing the bits output from the puncturer 260 from the first column to the $N_c^{th}$ column in a column direction, and reading the bits from the first row to the $N_r^{th}$ row in a row direction. Accordingly, the bits written on the same row of each column are output in sequence so that the bits are rearranged in a different order from that before being interleaved.

The interleaver 270 may perform interleaving selectively according to a modulation method. For example, the interleaver 270 may perform interleaving only when the modulation method is 16-QAM, 64-QAM, or 256-QAM.

The number of columns, $N_c$, and the number of rows, $N_r$, constituting the interleaver 270 may be changed according to a code rate or an modulation method. For instance, if a code rate of an LDPC code is 7/15, the number of columns, $N_c$, may be the same as the number of modulation degree with respect to the L1-post signaling, and the number of rows, $N_r$, may be (the number of bits of an LDPC codeword output from the puncturer)/$N_c$. That is, if the number of bits of an LDPC codeword output from the puncturer 260 is $N_{L1post}$, since in a case where a modulation methods are 16-QAM, 64-QAM and 256-QAM respectively, modulation degrees are 4, 6 and 8 respectively, the number of rows, $N_r$, may be $N_{L1post}/4$, $N_{L1post}/6$, $N_{L1post}/8$, respectively.

The demultiplexer 280 demultiplexes bits output from the interleaver 270. Specifically, the demultiplexer 280 performs bit-to-cell conversion with respect to the bits output from the interleaver 270, thereby demultiplexing the output bits into a cell (or a parallel data cell) having a specific number of bits.

For instance, the demultiplexer 280 may output the interleaved bits of the LDPC codeword, which are output from the interleaver 270, to a plurality of sub frames in sequence, thereby converting the interleaved bits of the LDPC codeword into cells and then outputting the converted interleaved bits. In this case, bits having the same index in each of the plurality of sub streams may constitute the same cell.

Here, the number of sub streams is the same as that of bits constituting cells. For instance, if modulations methods are BPSK, QPSK, 16-QAM, 64-QAM, 256-QAM respectively, the number of sub streams may be 1, 2, 4, 6 and 8, and the number of cells may be $N_{L1post}$, $N_{L1post}/2$, $N_{L1post}/4$, $N_{L1post}/6$, $N_{L1post}/8$ respectively.

The demultiplexer 280 may perform interleaving selectively according to a modulation method. For instance, if the modulation method is BPSK, the demultiplexer 280 may not perform demultiplexing operation.

The modulator 290 may modulate cells output from the demultiplexer 280. Specifically, the modulator 290 may map cells output from the demultiplexer 280 to constellation points using various modulation methods such as BPSK, QPSK, 16-QAM, 64-QAM, 256-QAM, etc. and modulate the cells. When modulations methods are BPSK, QPSK, 16-QAM, 64-QAM, 256-QAM, respectively, the number of bits constituting the modulated cells (i.e., modulation symbol) may be 1, 2, 4, 6 and 8 respectively.

The transmitter 200 may transmit the modulation symbols to a receiver (not illustrated). For instance, the transmitter 200 may map the modulation symbols to an OFDM frame using an OFDM method and transmit the modulation symbols to the receiver through an assigned channel. In this case, the modulation symbols of the L1 signaling may be mapped to a preamble in the OFDM frame.

Figure 11:
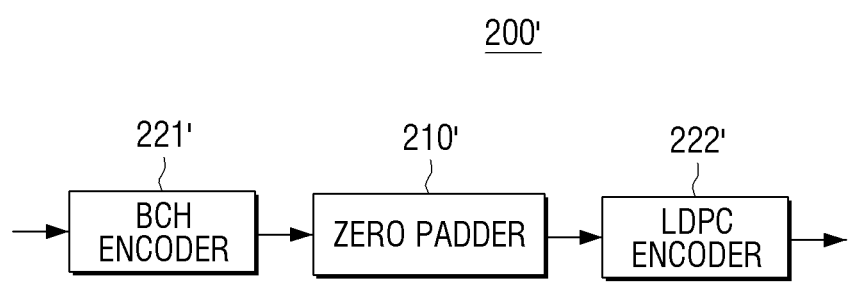

FIG. 11 is a block diagram provided to explain a configuration of a transmitter according to another exemplary embodiment. Referring to FIG. 11, a transmitter 200' includes a BCH encoder 221', a zero padder 210' and an LDPC encoder 222'.

The transmitter 200' illustrated in FIG. 11 is the same as the transmitter 200 in terms of the operations performed by each of its elements, used parameters, etc., only differing in how the elements are arranged. Thus, hereinafter, the transmitter 200' will be explained, particularly with a focus on the above-described differences.

The BCH encoder 221' performs BCH encoding with respect to an L1-post signaling and outputs a BCH codeword which is generated by the BCH encoding to the zero padder 210'.

In this case, the L1-post signaling may have the same length as that of an information word, which is required for BCH encoding, and 168 BCH parity bits may be generated by the BCH encoding.

The zero padder 210' pads zero bits to a BCH codeword and outputs the BCH codeword to an LDPC encoder 222'.

Here, when a BCH codeword is formed of $N_{bch}$ number of bits, and when a length of an information word of an LDPC code is $K_{ldpc}$, the zero padder 210' may pad $K_{ldpc} - N_{bch}$ number of zero bits.

Zero bits may be padded in the same way as described in FIGS. 2 to 10. Meanwhile, an information word to which zero bits are padded in FIGS. 2 to 10 is an information word of a BCH code, whereas an information word to which zero bits are padded in the present exemplary embodiment may be an information word of an LDPC code. Thus, what is applied to the information word of the BCH code as shown in FIGS. 2 to 10 may be applied to the information word of the LDPC code.

The LDPC encoder 222' performs LDPC encoding with respect to a BCH codeword where zero bits are padded.

Figure 12:
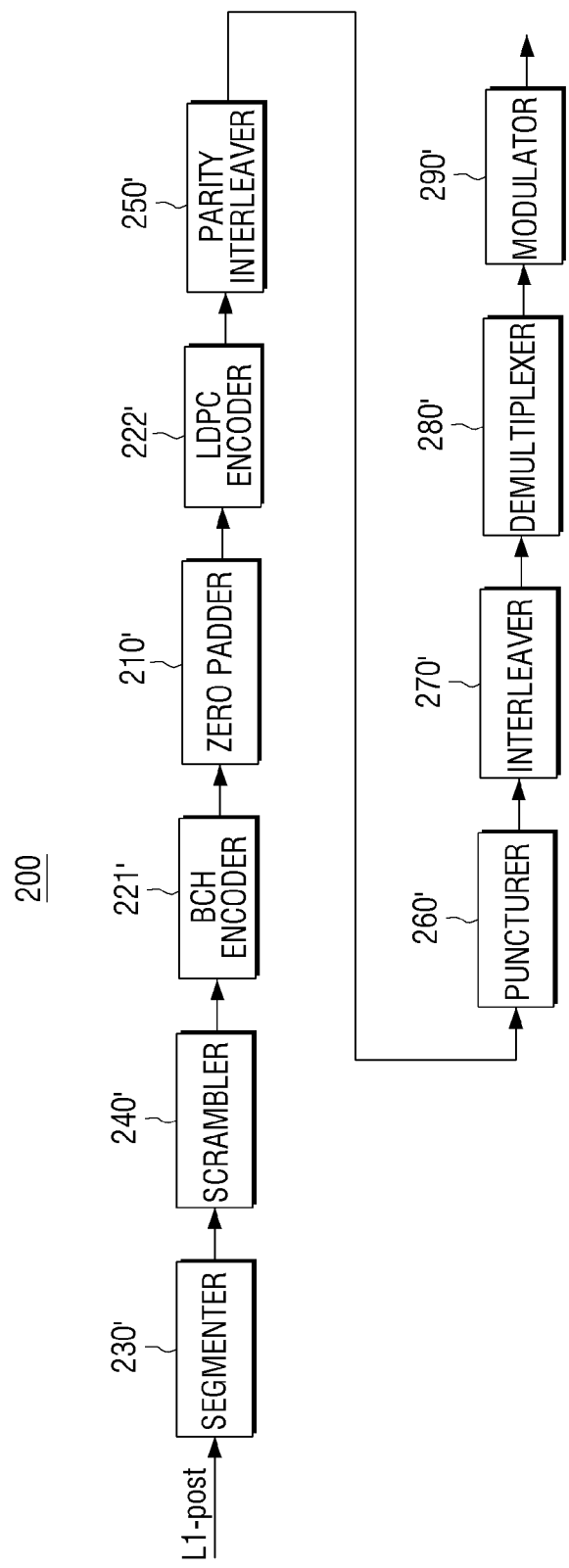
FIG. 12 is a block diagram provided to explain a detailed configuration of a transmitter according to another exemplary embodiment.

FIG. 12 is a block diagram provided to explain a detailed configuration of a transmitter according to another exemplary embodiment. Referring to FIG. 12, a transmitter 200' includes a segmenter 230', a scrambler 240', a parity interleaver 250', a puncturer 260', an interleaver 270', a modulator 280' in addition to an BCH encoder 221', a zero padder 210' and an LDPC encoder 222'.

Here, considering that the BCH encoder 221' and the zero padder 210' have been explained above in FIG. 11, a detailed explanation on the zero padder 210 and the encoder 220 is omitted. The transmitter 200' is the same as the transmitter 200 in terms of the operations performed by each of its elements, used parameters, only differing in how the elements are arranged. Thus, hereinafter, the transmitter 200' will be explained, particularly with a focus on the above-described differences.

The scrambler 240' scrambles a segmented L1-post signaling and outputs the scrambled post signaling to a BCH encoder 221'.

Thus, the BCH 221' performs BCH encoding of the L1-post signaling output from the scrambler 240. The zero padder 210 pads zero bits to a BCH codeword output from the BCH 221' and outputs the BCH codeword to an LDPC encoder 222'. The LDPC encoder 222' may perform LDPC encoding on the BCH codeword where zero bits are padded to generate an LDPC codeword and output the LDPC codeword to a parity interleaver 250'.

Figure 13:
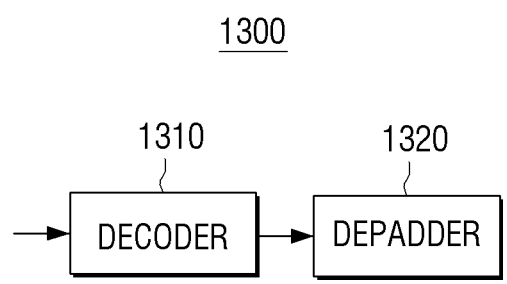
FIG. 13 is a block diagram provided to explain a configuration of a receiver according to an exemplary embodiment.

FIG. 13 is a block diagram provided to explain a configuration of a receiver according to an exemplary embodiment. According to FIG. 13, the receiver 1300 includes a decoder 1310 and a depadder 1320.

Figure 14:
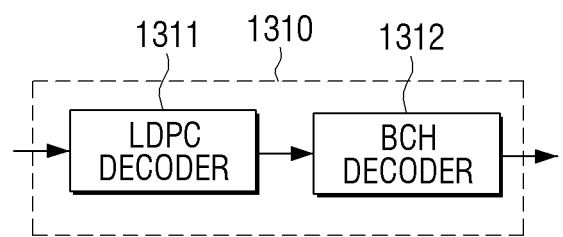
FIG. 14 is a block diagram provided to explain a detailed configuration of an encoder according to an exemplary embodiment.

The decoder 1310 decodes a signal received from the transmitter 200. To perform the decoding, the decoder 1320 may further include an LDPC decoder 1311 and a BCH decoder 1312 as shown in FIG. 14.

Specifically, the LDPC decoder 1311 may use LLR values of the signal received from the transmitter 200 to perform LDPC decoding. In this case, the transmitter 1300 may further include a demodulator (not illustrated) for generating LLR values which correspond to an LDPC codeword by demodulating the received signal.

For example, the LDPC decoder 1311 may perform the LDPC decoding by an iterative decoding method based on a sum-product algorithm. The sum-product algorithm is one example of a message passing algorithm, and the message passing algorithm refers to an algorithm which exchanges messages (e.g., LLR value) through an edge on a bipartite graph generated based on a parity check matrix, calculates an output message from messages input into variable nodes or check nodes, and updates the output message.

Here, a parity check matrix used for LDPC decoding has a structure as shown in FIG. 4, and may be formed of an information word sub matrix and a parity sub matrix. Here, the information sub matrix may be defined as shown in Table 3 and parity sub matrix may have a dual diagonal structure. A receiver 1300 may have a memory (not illustrated) and have prestored information on the parity check matrix.

Then, the BCH decoder 1312 performs BCH decoding of the output value from the LDPC decoder 1311.

Here, considering that an output value from the LDPC decoder 1311 includes an L1-post signaling, zero bits which are padded to the L1-post signaling and BCH parity bits, the BCH decoder 1312 may correct error using BCH parity bits and output the L1-post signaling and zero bits which are padded to the L1-post signaling to the depadder 1320.

Information on a code parameter used for the above decoding may be prestored in the receiver 1300 or be provided from the transmitter 200.

The depadder 1320 may depad zero bits which are padded to the L1-post signaling. Accordingly, the zero bits can be removed and thus the L1-post signaling can be restored.

Specifically, the depadder 1320 may determine groups, constituting an information word output from the BCH decoder 1312, where zero bits are padded and groups where additional zero bits are padded based on information on the number of groups of padded zero bits and a predetermined shortening pattern, and remove zero bits which exist in the corresponding groups. Here, the predetermined shortening pattern may be defined as in the above described Table 4.

In particular, the depadder 1320 may determine whether additional zero bits are padded, starting from a front end or back end of the corresponding group and remove the additional zero bits depending on the result of the determination.

Various kinds of information for depadding, for example, the number of groups of padded zero bits, shortening pattern, etc. may be prestored in the receiver 1300 or be provided from the transmitter 200.

Figure 15:
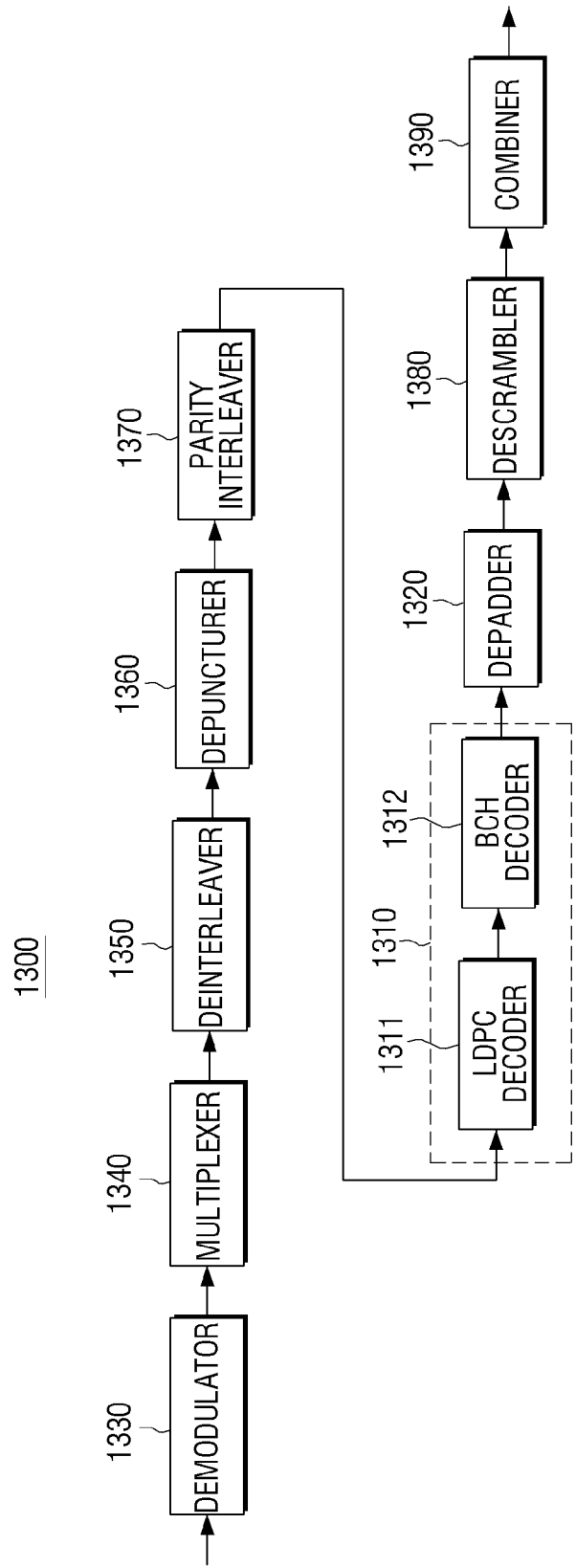
FIG. 15 is a block diagram provided to explain a detailed configuration of a receiver according to an exemplary embodiment.

FIG. 15 is a block diagram provided to explain a detailed configuration of a receiver according to an exemplary embodiment. Referring to FIG. 15, a receiver 1300 may further include a demodulator 1330, a multiplexer 1340, a deinterleaver 1350, a depuncturer 1360, a parity interleaver 1370, a descrambler 1380 and a combiner 1360 as well as a decoder 1310 and a depadder 1320. Here, considering that the decoder 1310 and the depadder 1320 have been explained in FIG. 14, a detailed explanation on the decoder 1310 and the depadder 1320 is omitted.

The demodulator 1330 receives and then demodulates a signal received from the transmitter 200. Specifically, the demodulator 1330 may demodulate the received signal, generate a value corresponding to an LDPC codeword and output the generated value to a multiplexer 1340.

Here, the value corresponding to the LDPC codeword may be expressed as a channel value. There may be various methods of determining a channel value, and a method of determining an LLR value may be a method of determining a channel value.

Here, an LLR value may be expressed as a value obtained by taking the logarithm of the rate of a probability where a bit transmitted from the transmitter 200 should be zero (0) to a probability where a bit transmitted from the transmitter 200 should be one (1). Alternately, an LLR value may be a bit value itself determined by a hard decision or and may be a representative value determined depending on any section where covers the probability of the bit transmitted from the transmitter 100 being 0 or otherwise the probability thereof being 1.

The multiplexer 1340 multiplexes the value output from the demodulator 1330 and output the output value to the deinterleaver 1350.

Specifically, the multiplexor 1350, which is an element which corresponds to the demultiplexer 260, may performs an operation corresponding to that of the demultiplexer 280. That is, the multiplexor 1350 may perform cell-to-bit conversion of the output value of the demodulator 1330 and multiplex LLR values on per-cell basis to on per-bit basis.

The deinterleaver 1350 may deinterleave an output value from the multiplexer 1340 and output the output value to the depuncturer 1360.

Specifically, the deinterleaver 1350, which is an element which corresponds to the interleaver 270 of the transmitter 200, may perform an operation corresponding to that of the interleaver 270. That is, the deinterleaver 1350 may perform a reverse operation of the interleaving operation performed by the interleaver 270 and deinterleave the output value from the multiplexer 1340.

The depuncturer 1360 assigns a specific value to the output value from the deinterleaver 1350 and output the output value to the parity deinterleaver 1370.

Specifically, the depuncturer 1360, which is an element which corresponds to the puncturer 260 of the transmitter 200, may perform an operation corresponding to that of the puncturer 260. That is, the depuncturer 1360 may add LLR values corresponding to the punctured parity bits and LLR values corresponding to shortened bits to the LLR values output from the deinterleaver 1350. Here, the LLR values corresponding to the punctured parity bits may be 0, and the LLR values corresponding to the shortened bits may be $\infty$ or $-\infty$.

To perform the operation, the receiver 1300 may prestore the numbers and positions of the bits punctured or have the information be provided from the transmitter 200. Further, the receiver 1300 may prestore information on the numbers and positions of the shortened bits or bit values or have the information be provided from the transmitter 200.

The parity deinterleaver 1370 performs parity deinterleaving on the output value from the depuncturer 1360 and outputs the output value to the decoder 1310.

Specifically, the parity deinterleaver 1370, which is an element which corresponds to the parity interleaver 250 of the transmitter 200, may perform an operation corresponding to that of the parity interleaver 250. That is, the parity deinterleaver 1370 may perform a reverse operation of the interleaving operation performed by the parity interleaver 250 and thus may deinterleave LLR values corresponding to LDPC parity bits out of the LLR values output by the depuncturer 1360.

In this case, the decoder 1310 may decode the output value from the parity interleaver 1370 and output the bits generated by the decoding to a depadder 1320. In this case, bits generated by the decoding may be formed of an L1-post signaling and zero bits which are padded to the L1-post signaling, and the zero bits may be removed by the depadder 1320.

The descrambler 1380 descrambles the L1-post signaling.

Specifically, the descrambler 1380, which is an element which corresponds to the scrambler 240 of the transmitter 200, may perform an operation corresponding to that of the scrambler 240. That is, the descrambler 1380 may perform reverse-randomization of L1-post signaling bits and output the reverse-randomized L1-post signaling to the combiner 1390.

The combiner 1390 performs desegmentation with respect to the output value from the descrambler 1380.

Specifically, the combiner 1390, which is an element which corresponds to the segmenter 230 of the transmitter 200, may perform an operation corresponding to that of the segmenter 230. That is, the combiner 1390 may desegment a plurality of segmented L1-post signalings to generate an L1-post signaling in a form before being segmented.

Figure 16:
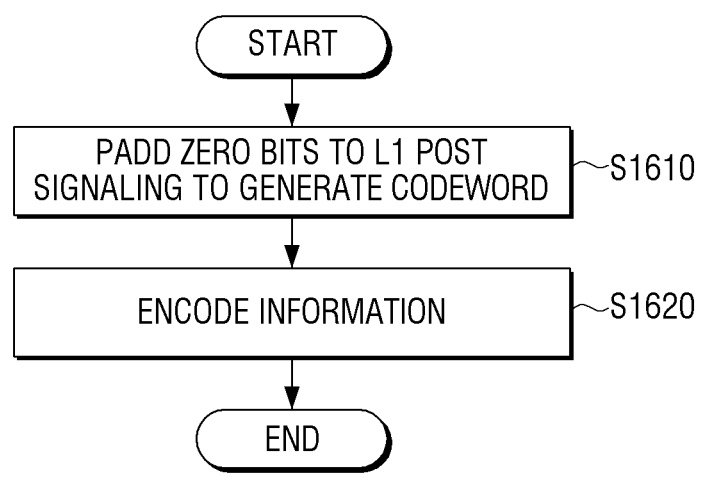
FIG. 16 is a flowchart provided to explain a method of padding zero bits of a transmitter according to an exemplary embodiment.

FIG. 16 is a flowchart provided to explain a zero bit padding method of a transmitter according to an exemplary embodiment.

First, zero bits are padded to an L1-post signaling to generate an information word (S1610).

Then, the information word is encoded (S1620).

Specifically, in S1610, the information word may be divided into a plurality of groups, zero bits are padded into at least one of the plurality of groups by group unit, and additional zero bits may be padded based on a predetermined criterion, starting from a front or back end of at least one of the remaining groups among the plurality of groups.

Here, the number of groups constituting the information word may be calculated based on a number of bits of the information word, and the information word may be divided into a plurality of groups based on the calculated number of groups.

In this case, the number of groups of padded zero bits may be calculated based on the number of groups constituting the information word and the number of the padded zero bits.

For instance, if the number of bits constituting the L1-post signaling is not more than the number of bits constituting one of the plurality of groups, the number of groups of padded zero bits may be calculated based on above Equation 6.

Further, if the number of bits constituting the L1-post signaling exceeds the number of bits included in one of the plurality of groups, the number of groups of the padded zero bits may be calculated based on above Equation 7.

In S1610, a position of a group to which the zero bits are padded may be determined based on a predetermined shortening pattern, and the zero bits may be padded to the determined position by group unit.

Here, the predetermined shortening pattern may be defined as shown in Table 4, and if the number of the padded zero bits is $N_{pad}$, the zero bits may be padded to $\pi s(0)^{th}$ group, $\pi s(1)^{th}$ group, . . . , $\pi(N_{pad}-1)^{th}$ group by group unit, among the plurality of groups.

In this case, if $N_{pad}$ satisfies the predetermined first criterion, $\pi_s(N_{pad})^{th}$ group may be determined as a group where the additional zero bits are padded based on above Table 4, and additional zero bits may be padded in sequence, starting from the back end of the $\pi_s(N_{pad})^{th}$ group.

Here, the predetermined first criterion may be that if the number of groups constituting the information word is $N_{pad}$, $N_{pad}=N_{group}-1$. When the number of bits included in one of the plurality of groups is 360 and the number of bits constituting the L1-post signaling is $K_{sig}$, the number of the additional zero bits is $360-K_{sig}$.

If $N_{pad}$ satisfies the predetermined second criterion, $\pi_s(N_{pad})^{th}$ group may be determined as a group where the additional zero bits are padded based on above Table 4, and additional zero bits may be padded in sequence, starting from the back end of the $\pi_s(N_{pad})^{th}$ group.

Here, the predetermined second criterion may be that if the number of bits constituting the information word is $N_{group}$, $\pi_s(N_{pad})$ is less than a predetermined value and $N_{pad}<N_{group}-1$. Further, if the number of bits constituting the information word is $K_{bch}$, the number of bits constituting the L1-post signaling is $K_{sig}$, and the number of bits included in one of the plurality of groups is 360, the number of the additional zero bits may be $K_{bch}-K_{sig}-360 \times N_{pad}$.

If the $N_{pad}$ does not satisfy the predetermined first and second criteria, the zero padder may determine $\pi_s(N_{pad})^{th}$ group as a group where the additional zero bits are padded based on above Table 4 and perform padding of additional zero bits in sequence, starting from the front end of the $\pi_s(N_{pad})^{th}$ group.

If the number of bits constituting the information word is $K_{bch}$, the number of bits constituting the L1-post signaling is $K_{sig}$, and the number of bits included in one of the plurality of groups is 360, the number of the additional zero bits is $K_{bch}-K_{sig}-360 \times N_{pad}$.

In S1610, the L1-post signaling may be mapped in sequence to a position where the zero bits are not padded in the information word to generate the information word.

According to an exemplary embodiment, a zero bit depadding method of a receiver may be provided to be consistent with the above descriptions with regard to the receiver 1300. Since the depadding method is the same or similar to the functions of the elements of FIGS. 13-15, the descriptions about the zero bit depadding method are omitted.

In the above embodiments, zero bits are padded to the L1-post signaling. According to another exemplary embodiment, bits having a different value may be padded for the same purpose as the zero bit padding.

Meanwhile, a non-transitory computer readable medium may be provided which stores a program carrying out the zero bits padding or depadding method, according an exemplary embodiment.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray disk, USB, memory card, and ROM and provided therein.

The elements represented by blocks as illustrated in FIGS. 2, 3, 9 and 11-16 may be embodied as various numbers of hardware, software and/or firmware structures that execute respective functions described above, according to an exemplary embodiment. For example, these elements may use a direct circuit structure, such as a memory, processing, logic, a look-up table, etc. that may execute the respective functions through controls of one or more microprocessors or other control apparatuses. Also, these elements may be specifically embodied by a program or a part of code, which contains one or more executable instructions for performing specified logic functions. Also, at least one of these elements may further include a processor such as a central processing unit (CPU) that performs the respective functions, a microprocessor, or the like. Although a bus is not illustrated in the above block diagrams of FIGS. 2, 3, 9 and 11-16, communication between the respective blocks may be performed via the bus.

The foregoing embodiments and advantages are merely exemplary and should not be construed as limiting the inventive concept. Also, the description of the exemplary embodiments of the inventive concept is intended to be illustrative, and not to limit the scope of the claims, and many alternatives, modifications, and variations will be apparent to those skilled in the art.

What is claimed is:

1. A transmitter which processes and transmits an L1-post signaling, comprising:
   a zero padder configured to divide an information word into a plurality of groups, pad zero bits to at least one of the plurality of groups by group unit, and pad additional zero bits to at least one of the plurality of groups remaining after the zero bits are padded, thereby constituting the information word for encoding the L1-post signaling; and
   an encoder configured to perform encoding on the information word for encoding the L1-post signaling,
   wherein the zero padder pads the additional zero bits according to a predetermined criterion, starting from one of a front end and a back end, determined according to whether the predetermined criterion is satisfied, of the at least one of the remaining groups.

2. The transmitter of claim 1, wherein the zero padder calculates a number of the plurality of groups dividing the information word based on a number of bits constituting the information word and divides the information word into the plurality of groups based on the calculated number of groups.

3. The transmitter of claim 2, wherein the zero padder calculates a number of groups of the padded zero bits based on the number of groups constituting the information word and a number of the padded zero bits.

4. The transmitter of claim 3, wherein in a case that a number of bits constituting the L1-post signaling is not more than a number of bits constituting one of the plurality of groups, the zero padder calculates the number of groups of the padded zero bits based on a following equation:

$$N_{pad}=N_{group}-1,$$

where $N_{pad}$ is the number of groups of the padded zero bits and $N_{group}$ is the number of groups dividing the information word.

5. The transmitter of claim 3, wherein in a case that the number of bits constituting the L1-post signaling exceeds a number of bits constituting one of the plurality of groups, the zero padder calculates the number of groups of the padded zero bits based on a following equation:

$$N_{pad} = \left\lfloor \frac{K_{bch} - K_{sig}}{360} \right\rfloor,$$

where $N_{pad}$ is the number of groups of the padded zero bits, $K_{bch}$ is the number of bits constituting the information word, $K_{sig}$ is a number of bits constituting the L1-post signaling, and $K_{bch}-K_{sig}$ is the number of the padded zero bits.

6. The transmitter of claim 3, wherein the zero padder determines a position of a group in the plurality of groups of the information word where the zero bits are padded based on a predetermined shortening pattern, and pads the zero bits to the determined position by group unit.

7. The transmitter of claim 6, wherein the predetermined shortening pattern is defined as shown in a table below:

| Modulation and code rate | $N_{group}$ | $\pi_s(j)$ ($0 \le j < N_{group}$) | | | | | | | | | | |
|---|---|---|---|---|---|---|---|---|---|---|---|---|
| | | $\pi_s(0)$ $\pi_s(11)$ | $\pi_s(1)$ $\pi_s(12)$ | $\pi_s(2)$ $\pi_s(13)$ | $\pi_s(3)$ $\pi_s(14)$ | $\pi_s(4)$ $\pi_s(15)$ | $\pi_s(5)$ $\pi_s(16)$ | $\pi_s(6)$ $\pi_s(17)$ | $\pi_s(7)$ $\pi_s(18)$ | $\pi_s(8)$ $\pi_s(19)$ | $\pi_s(9)$ $\pi_s(20)$ | $\pi_s(10)$ |
| BPSK/QPSK 7/15 | 21 | 4 2 | 5 16 | 6 17 | 7 18 | 8 1 | 8 10 | 3 19 | 12 11 | 13 20 | 14 0 | 15 |

| Modulation and code rate | | $N_{group}$ | $\pi_s(j)$ $(0 \leq j < N_{group})$ | | | | | | | | | | |
|---|---|---|---|---|---|---|---|---|---|---|---|---|---|
| | | | $\pi_s(0)$ $\pi_s(11)$ | $\pi_s(1)$ $\pi_s(12)$ | $\pi_s(2)$ $\pi_s(13)$ | $\pi_s(3)$ $\pi_s(14)$ | $\pi_s(4)$ $\pi_s(15)$ | $\pi_s(5)$ $\pi_s(16)$ | $\pi_s(6)$ $\pi_s(17)$ | $\pi_s(7)$ $\pi_s(18)$ | $\pi_s(8)$ $\pi_s(19)$ | $\pi_s(9)$ $\pi_s(20)$ | $\pi_s(10)$ |
| 16-QAM | 7/15 | 21 | 4 3 | 5 8 | 12 9 | 13 2 | 14 10 | 15 1 | 16 19 | 17 11 | 18 20 | 6 0 | 7 |
| 64-QAM | 7/15 | 21 | 12 10 | 4 11 | 13 2 | 5 16 | 14 17 | 6 1 | 15 18 | 7 19 | 8 20 | 3 0 | 9 |
| 256-QAM | 7/15 | 21 | 4 7 | 12 2 | 13 8 | 3 19 | 14 1 | 15 9 | 5 10 | 16 11 | 17 20 | 6 0 | 18 | where in a case that the number of groups of the padded zero bits is $N_{pad}$, the zero padder pads the zero bits to $\pi s(0)^{th}$ group, $\pi s(1)^{th}$ group, ..., $\pi s(N_{pad}-1)^{th}$ group among the plurality of groups, by group unit.

8. The transmitter of claim 7, wherein in a case that $N_{pad}$ satisfies a predetermined first criterion, the zero padder determines $\pi_s(N_{pad})^{th}$ group as a group where the additional zero bits are padded based on the table, and pads the additional zero bits in sequence, starting from a back end of the $\pi_s(N_{pad})^{th}$ group.

9. The transmitter of claim 8, wherein the predetermined first criterion is that in a case that the number of groups constituting the information word is $N_{pad}$ and $N_{group}$ is the number of groups dividing the information word, $N_{pad}=N_{group}-1$.

10. The transmitter of claim 8, wherein in a case that a number of bits constituting one of the plurality of groups of the information word is 360 and a number of bits constituting the L1-post signaling is $K_{sig}$, a number of the additional zero bits is $360-K_{sig}$.

11. The transmitter of claim 8, wherein in a case that $N_{pad}$ satisfies a predetermined second criterion, the zero padder determines $\pi_s(N_{pad})^{th}$ group as a group where the additional zero bits are padded based on the table and pads the additional zero bits in sequence, starting from a back end of the $\pi_s(N_{pad})^{th}$ group.

12. The transmitter of claim 11, wherein the predetermined second criterion is that in a case that the number of groups dividing the information word is $N_{group}$, $\pi_s(N_{pad})$ is less than a predetermined value, and $N_{pad}<N_{group}-1$.

13. The transmitter of claim 11, wherein in a case that the number of bits constituting the information word is $K_{bch}$, a number of bits constituting the L1-post signaling is $K_{sig}$, and a number of bits included in one of the plurality of groups of the information word is 360, a number of the additional zero bits is $K_{bch}-K_{sig}-360 \times N_{pad}$.

14. The transmitter of claim 11, wherein in a case that $N_{pad}$ does not satisfy the predetermined first and second criteria, the zero padder determines the $\pi_s(N_{pad})^{th}$ group as a group where the additional zero bits are padded based on the table and pads the additional zero bits in sequence, starting from a front end of the $\pi_s(N_{pad})^{th}$ group.

15. The transmitter of claim 14, wherein in a case that a number of bits constituting the information word is $K_{bch}$, a number of bits constituting the L1-post signaling is $K_{sig}$, and a number of bits included in one of the plurality of groups is 360, a number of the additional zero bits is $K_{bch}-K_{sig}-360 \times N_{pad}$.

16. The transmitter of claim 1, wherein the zero padder maps the L1-post signaling in sequence to a position where the zero bits are not padded in the information word to constitute the information word for encoding the L1-post signaling.

17. A zero bits padding method of a transmitter which processes and transmits an L1-post signaling, the method comprising:

dividing an information word into a plurality of groups;
padding zero bits to at least one of the plurality of groups by group unit;
padding additional zero bits to at least one of the plurality of groups remaining after the zero bits are padded, thereby constituting the information word for encoding the L1-post signaling; and
performing encoding on the information word for encoding the L1-post signaling,
wherein the additional zero bits are padded according to a predetermined criterion, starting from one of a front end and a back end, determined according to whether the predetermined criterion is satisfied, of the at least one of the remaining groups.

18. The zero bits padding method of claim 17, further comprising calculating a number of the plurality of groups dividing the information word based on a number of bits constituting the information word and divides the information word into the plurality of groups based on the calculated number of groups.

19. The zero bits padding method of claim 18, further comprising calculating a number of groups of the padded zero bits based on the number of groups constituting the information word and a number of the padded zero bits.

20. The zero bits padding method of claim 19, wherein in a case that a number of bits constituting the L1-post signaling is not more than a number of bits constituting one of the plurality of groups, the number of groups of the padded zero bits is calculated based on a following equation:

$$N_{pad}=N_{group}-1,$$

where $N_{pad}$ is the number of groups of the padded zero bits and $N_{group}$ is the number of groups dividing the information word.

21. The zero bits padding method of claim 19, wherein in a case that the number of bits constituting the L1-post signaling exceeds a number of bits constituting one of the plurality of groups, the number of groups of the padded zero bits is calculated based on a following equation:

$$N_{pad} = \left\lfloor \frac{K_{bch} - K_{sig}}{360} \right\rfloor,$$

where $N_{pad}$ is the number of groups of the padded bits, $K_{bch}$ is the number of bits constituting the information word, $K_{sig}$ is a number of bits constituting the L1-post signaling, and $K_{bch}-K_{sig}$ is the number of the padded zero bits.

22. The zero bits padding method of claim 19, further comprising determining a position of a group in the plurality of groups of the information word where the zero bits are padded based on a predetermined shortening pattern,
wherein the zero bits are padded to the determined position by group unit.

23. The zero bits padding method of claim 22, wherein the predetermined shortening pattern is defined as shown in a table below:

| Modulation and code rate | | $N_{group}$ | $\pi_s(0)$ $\pi_s(11)$ | $\pi_s(1)$ $\pi_s(12)$ | $\pi_s(2)$ $\pi_s(13)$ | $\pi_s(3)$ $\pi_s(14)$ | $\pi_s(4)$ $\pi_s(15)$ | $\pi_s(5)$ $\pi_s(16)$ | $\pi_s(6)$ $\pi_s(17)$ | $\pi_s(7)$ $\pi_s(18)$ | $\pi_s(8)$ $\pi_s(19)$ | $\pi_s(9)$ $\pi_s(20)$ | $\pi_s(10)$ |
|---|---|---|---|---|---|---|---|---|---|---|---|---|---|
| BPSK/QPSK | 7/15 | 21 | 4 | 5 | 6 | 7 | 8 | 9 | 3 | 12 | 13 | 14 | 15 |
|  |  |  | 2 | 16 | 17 | 18 | 1 | 10 | 19 | 11 | 20 | 0 |  |
| 16-QAM | 7/15 | 21 | 4 | 5 | 12 | 13 | 14 | 15 | 18 | 17 | 18 | 6 | 7 |
|  |  |  | 3 | 8 | 9 | 2 | 10 | 1 | 19 | 11 | 20 | 0 |  |
| 64-QAM | 7/15 | 21 | 12 | 4 | 13 | 5 | 14 | 6 | 15 | 7 | 8 | 3 | 9 |
|  |  |  | 10 | 11 | 2 | 16 | 17 | 1 | 18 | 19 | 20 | 0 |  |
| 256-QAM | 7/15 | 21 | 4 | 12 | 13 | 3 | 14 | 15 | 5 | 16 | 17 | 6 | 18 |
|  |  |  | 7 | 2 | 8 | 19 | 1 | 9 | 10 | 11 | 20 | 0 |  | where in a case that the number of groups of the padded zero bits is $N_{pad}$, the zero bits are padded to $\pi s(0)^{th}$ group, $\pi s(1)^{th}$ group, ..., $\pi s(N_{pad}-1)^{th}$ group among the plurality of groups, by group unit.

24. The zero bits padding method of claim 23, wherein the padding additional zero bits comprises, in a case that $N_{pad}$ satisfies a predetermined first criterion, determining $\pi_s(N_{pad})^{th}$ group as a group where the additional zero bits are padded based on the table, and padding the additional zero bits in sequence, starting from a back end of the $\pi_s(N_{pad})^{th}$ group.

25. The zero bits padding method of claim 24, wherein the predetermined first criterion is that in a case that the number of groups constituting the information word is $N_{pad}$ and $N_{group}$ is the number of groups dividing the information word, $N_{pad}=N_{group}-1$.

26. The zero bits padding method of claim 24, wherein in a case that a number of bits constituting one of the plurality of groups of the information word is 360 and a number of bits constituting the L1-post signaling is $K_{sig}$, a number of the additional zero bits is $360-K_{sig}$.

27. The zero bits padding method of claim 24, wherein the padding additional zero bits comprises, in a case that $N_{pad}$ satisfies a predetermined second criterion, determining $\pi_s(N_{pad})^{th}$ group as a group where the additional zero bits are padded based on the table, and padding the additional zero bits in sequence, starting from a back end of the $\pi_s(N_{pad})^{th}$ group.

28. The zero bits padding method of claim 27, wherein the predetermined second criterion is that in a case that the number of groups dividing the information word is $N_{group}$, $\pi_s(N_{pad})$ is less than a predetermined value, and $N_{pad}<N_{group}-1$.

29. The zero bits padding method of claim 27, wherein in a case that the number of bits constituting the information word is $K_{bch}$, a number of bits constituting the L1-post signaling is $K_{sig}$, and a number of bits included in one of the plurality of groups of the information word is 360, a number of the additional zero bits is $K_{bch}-K_{sig}-360 \times N_{pad}$.

30. The zero bits padding method of claim 27, wherein the padding additional zero bits comprises, in a case that $N_{pad}$ does not satisfy the predetermined first and second criteria, determining $\pi_s(N_{pad})^{th}$ group as a group where the additional zero bits are padded based on the table, and padding the additional zero bits in sequence, starting from a front end of the $\pi_s(N_{pad})^{th}$ group.

31. The zero bits padding method of claim 30, wherein in a case that a number of bits constituting the information word is $K_{bch}$, a number of bits constituting the L1-post signaling is $K_{sig}$, and a number of bits included in one of the plurality of groups is 360, a number of the additional zero bits is $K_{bch}-K_{sig}-360 \times N_{pad}$.

32. The method of claim 17, further comprising mapping the L1-post signaling in sequence to a position where the zero bits are not padded in the information word to constitute the information word for encoding the L1-post signaling.

* * * * *